United States Patent
Yoshimura et al.

(10) Patent No.: US 6,770,689 B1
(45) Date of Patent: Aug. 3, 2004

(54) AQUEOUS GLITTERING INK

(75) Inventors: Yasuyuki Yoshimura, Ibaraki (JP);
Naoshi Murata, Higashiosaka (JP);
Yuki Yamamoto, Yamatokoriyama (JP);
Tomohiro Sawa, Osaka (JP)

(73) Assignee: Sakura Color Products Corp., Osaka (JP)

( * ) Notice: Subject to any disclaimer, the term of this patent is extended or adjusted under 35 U.S.C. 154(b) by 0 days.

(21) Appl. No.: 09/665,534

(22) Filed: Sep. 19, 2000

Related U.S. Application Data

(63) Continuation-in-part of application No. 09/523,619, filed on Mar. 13, 2000.

(30) Foreign Application Priority Data

| Mar. 19, 1999 | (JP) | ............................................. 11-076868 |
| Dec. 20, 1999 | (JP) | ............................................. 11-360187 |
| Jan. 11, 2000 | (JP) | ......................................... 2000-002344 |
| Jan. 11, 2000 | (JP) | ......................................... 2000-002370 |

(51) Int. Cl.$^7$ ............................ C09D 11/18; C09C 1/24; C09C 1/64; C04B 14/20; C04B 14/22
(52) U.S. Cl. ........................ 523/161; 524/437; 524/441; 524/449; 524/494; 106/404; 106/417; 106/456; 106/489
(58) Field of Search ................................ 523/160, 161, 523/171; 524/441, 437, 494, 449; 106/31.6, 31.95, 417, 418, 436, 456, 482, 489, 457, 494, 404

(56) References Cited

U.S. PATENT DOCUMENTS

| 3,053,683 | A | * | 9/1962 | Yolles ........................ 427/220 |
| 3,331,699 | A | * | 7/1967 | Marshall et al. ............. 106/415 |
| 5,048,992 | A | * | 9/1991 | Loftin .......................... 401/209 |
| 5,510,397 | A | * | 4/1996 | Okuda et al. ................ 523/161 |
| 5,958,123 | A | * | 9/1999 | DA La Fuente ......... 106/31.69 |
| 6,099,629 | A | * | 8/2000 | Morita et al. ............... 106/31.6 |
| 6,171,381 | B1 | * | 1/2001 | Yoshimura et al. ........ 106/31.6 |
| 6,280,837 | B1 | * | 8/2001 | Mitzutani et al. ........... 428/323 |

FOREIGN PATENT DOCUMENTS

| EP | 600205 | * | 6/1994 |
| JP | 07118592 | * | 5/1995 |
| JP | 10077438 | * | 3/1998 |

OTHER PUBLICATIONS

Babich, Jeff D. and Edler, Gerhard; Coloring Technology for Plastics : "The Enhancement of Laser Marking Plastic Polymers with Pearlescent Pigments" (1999), pp. 323–326.*

* cited by examiner

*Primary Examiner*—Callie Shosho
(74) *Attorney, Agent, or Firm*—Howard C. Miskin, Esq.; Gloria Tsui-Yip, Esq.

(57) ABSTRACT

The glittering ink of the present invention contacts scaly glittering particles, a water-soluble resin, a water-soluble organic solvent, colorant and water. The said scaly glittering particles have a median diameter of at least 10 $\mu$m, a ratio of smoothness on the particle surface to a median diameter of not greater than 0.011, and a surface coating ratio of the said colorant in a written mark of not greater than 80% in a state of a dried written mark. In addition, the aqueous glittering ink of the present invention has the thixotropy index (T.I. value) of not less than 1.3, represented by the ratio of V0.5 to V1.0 (V0.5/V1.0), wherein V0.5 is the viscosity with the rotation speed of 0.5 rpm and V1.0 is the viscosity with the rotation speed of 1.0 rpm when the ink is measured by an ELD-typed viscometer (3° R14 cone, at the temperature of 20° C.) and the ink has the V0.5, the viscosity with the rotation speed of 0.5 rpm, of 1000~15000 mPa·s.

32 Claims, 1 Drawing Sheet

AQUEOUS GLITTERING INK

CROSS-REFERENCE TO RELATED APPLICATION

This application is a Continuation-in-Part application of and claims priority from, U.S. patent application Ser. No. 09/523,619 entitled "AQUEOUS GLITTERING INK COMPOSITION" filed on Mar. 13, 2000.

BACKGROUND OF THE INVENTION

1. Field of the Invention

The present invention relates to an aqueous glittering ink which can be suitably used for writing tools, printing inks, fields pertaining to coatings, cosmetics, and the like.

2. Description of the Prior Art

Heretofore, for the purpose of obtaining written marks with metallic luster such as gold and silver, aqueous ink using glittering pigments have been proposed. For example, Japanese Unexamined Patent Publication Hei 7-118592 proposes an aqueous ink using an aluminum powder pigment. Japanese Unexamined Patent Publication Hei 8-151547 proposes an ink using a pearlescent pigment. Japanese Unexamined Patent Publication Hei 11-29734 proposes an aqueous metallic ink prepared by coloring an aluminum powder with an organic pigment fixed.

However, in the case of such conventional aqueous inks using glittering pigments such as aluminum powder pigment, pearlescent pigment and the like, it has been difficult to obtain written marks or coated films with strong glittering feeling and spatial effect. Moreover, although in order to obtain, in particular, colored metallic color, a method has been adopted in which these glittering pigment particles are colored with coloring materials such as dyes and pigments, there has been a problem that the glittering feeling is lost despite the improvement in color development.

SUMMARY OF THE INVENTION

As a result of intensive studies for achieving the said objects, the present inventors have adopted an aqueous glittering ink containing scaly glittering particles, a water-soluble resin, a water-soluble organic solvent, a colorant and water, wherein the said scaly glittering particles have a median diameter of at least 10 $\mu$m, a ratio of smoothness on the particle surface to a median diameter of not greater than 0.011, and a surface coating ratio of the said colorant on the said particle surface of not greater than 80% in a state of dried written marks.

By adopting the said constituents, written marks or coated films can be obtained with a strong glittering feeling and a spatial effect, as well as a good color development compared with the aqueous ink using the conventional glittering pigments.

In particular, as a preferred embodiment of this invention, in addition to the above-mentioned constituents, it is desirable to use an aqueous ink having the pseudo-plasticity fluidity (thixotropic property), preferably an aqueous ink having the said thixotropy index (T.I. value) of not less than 1.3 represented by the ratio of V0.5 to V1.0 (V0.5/V1.0), wherein V0.5 is the viscosity with the rotation speed of 0.5 rpm and V1.0 is the viscosity with the rotation speed of 1.0 rpm when the ink is measured by an ELD-typed viscometer (3° R14 cone, at the temperature of 20° C.), more preferably an aqueous ink having the pseudo-plasticity fluidity (thixotropic property) with V0.5 of 1000~15000 mPa·s, preferably 1000~10000 mPa·s, the viscosity when measured by an ELD-typed viscometer with a rotation speed of 0.5 rpm(3° R14 cone at the temperature of 20° C.).

By preparing the aqueous ink having the said constituents, even in the case of containing the scaly glittering particles with the said parameters having quite a large particle size compared with that of the normal coloring pigments, it is capable of controling the dispersal stability of the said particles in the ink and is capable of preventing the sedimentation of the scaly glittering particles. Therefore, even in the case of applying the ink of this invention to the ink for a ball-point pen, for example, it is capable of showing the excellent glittering feeling of the glittering particles and the strong color development of the colorants at a time, while showing the stability and good writing performance since it can prevent the clogging of the glittering particles with the said large particle diameters at the pen tip.

The object of this invention is to provide a glittering aqueous ink having a stronger glittering feeling and spatial effect and better color development than those achieved by an aqueous ink using conventional glittering pigments without losing a glittering feeling.

The other object of this invention is to provide a glittering aqueous ink capable of showing the glittering feeling of the glittering particles and the color development of the colorants at a time, while maintaining the stability and good writing performance of the ink.

Figure 1:
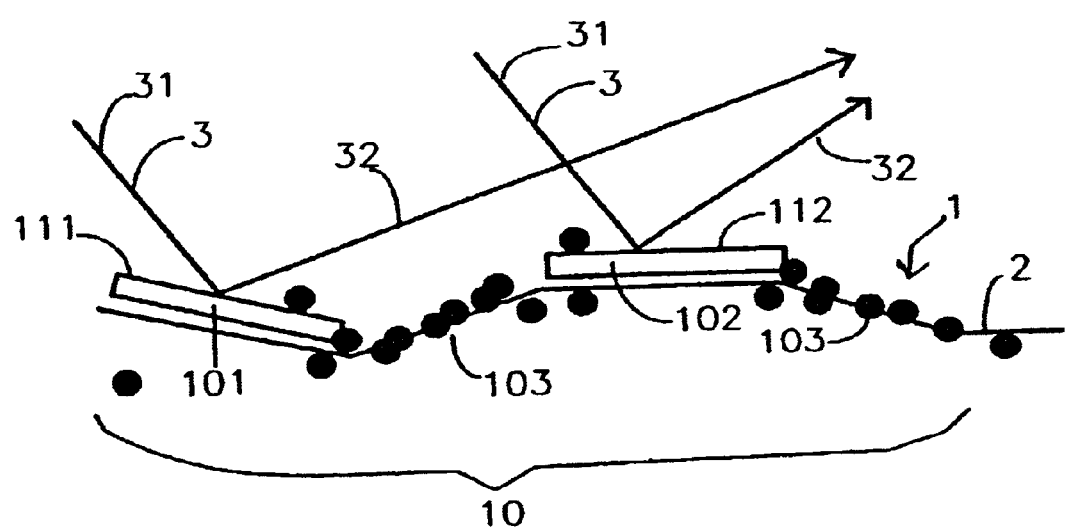
FIG. 1 is the schematic sectional view showing the typical example of written marks when writing with the ink by the said writing method

DESCRIPTION OF THE PREFERRED EMBODIMENT (Scaly Glittering Particles)

As the scaly glittering particles, it is important to have such particles having a median diameter of at least 10 $\mu$m, a ratio of smoothness on the particle surface to a median diameter of not greater than 0.011, and a surface coating ratio of the said colorant on the particle surface of not greater than 80% in a state of dried written marks.

The "glittering particles" in this invention refer to the particles which realize the glittering feeling on dried written marks or coated films, more concretely, referring to those particles with the said parameters.

Here, the said "median diameters" are the D50 value ($\mu$m) measured by laser diffraction analysis using an equipment manufactured by Leeda & Northlup under the trade name of "Microtrac HRA 9320-X100". In addition, the said smoothness is the average value of $R_{max}$ ($\mu$m), the maximum value of roughness measured on each surface of the several glittering particles which exist per unit area of the written marks or coated films in a state of dryness by using the electron microscope manufactured by ELIONIX INC. under the trade name of "ERA-8000".

According to this invention, when the ink is written or coated and forms the written marks or coated films, in such written marks or coated films, the larger the median diameters of the $D_{50}$ value, and the smaller the $R_{max}$, the maximum value of the said roughness on the surface, the stronger glittering feeling can be realized. Further, the inventors have found that, when the minimum value of the glittering feeling to which both parameters relate is associated as the ratio of the smoothness ($\mu$m) on the particle surface to the said median diameter ($\mu$m) of the glittering particles (smoothness (μm)/median diameter (μm)), the realization of the glittering feeling is related to the said ratio, in particular, when the ratio is not grater than 0.011, the glittering feeling is strongly realized.

Further, as above mentioned, it is important for the glittering particles in the present invention to have a surface coating ratio of the said colorant on the particle surface of not greater than 80% in a state of dried written marks. Here, the "surface coating ratio of the colorant" refers to the coating ratio of the colorant including the coloring pigment when covers the surface of a particle and is represented by the coating area of the colorant to the total surface area of the surface of a particle. In the present invention, the coating ratio of the colorant is 80 obtained as using the electron microscope manufactured by ELIONIX INC. under the trade name of "ERA-8000" as already mentioned, and measuring the average value of the surface area of the said particles and the coating area of the colorant on the several glittering particles existing per area in the written marks or coated films. This "surface coating ratio of the colorant" is the parameter capable of the adjustment, depending on the size, and contained amount of the glittering particles and colorant's parties, dispersability of each particle in the ink, and the viscosity of the ink.

In the case of an aqueous ink wherein the median diameter of the scaly glittering particles is less than 10 μm, a glittering feeling on the written marks or coated films lowers. Even in the case of an aqueous ink wherein the media diameter of the scaly glittering particles is not less than 10 μm, when the ratio of smoothness on the particle surface to the said median diameter exceeds 0.011, a glittering feeling on the written marks or coated films also lowers. In the case of an ink wherein the surface coating ratio of the said colorant coating the surface of the said scaly glittering particles in written marks and coated films marks exceeds 80%, a glittering feeling also lowers. For information, in the case of the scaly glittering particles whose median diameter is at least 25 μm, preferably not less than 30 μm the excellent glittering feeling appears in written marks or coated films.

In the present invention, examples of the glittering particles capable of having the said parameter include the glass flake particles and the metal coated inorganic particles. Here, the glass flake particles are defined as particles wherein a flaky glass is coated with a metal and the like. And the metal coated inorganic particles are defined as a general term of inorganic particles coated with a substance, at least either one of a metal or a metallic oxide.

The aqueous ink containing such particles as having a median diameter of at least 10 μm, the ratio of smoothness on the particle surface to the said median diameter of not greater than 0.011, and the surface coating ratio of the said colorant on the particle surface of not greater than 80% in a state of dried written marks is capable of forming written marks or coated films with a glittering feeling and a spatial effect which the glittering particles originally have and the good color development which the colorants have.

As an example of glass flake particles, a glass flake particles formed of a flaky glass coated with metal by electroless plating can be used For example, ones coated with silver available from Toyo Aluminium Co., Ltd. under the trade names of "Metashine REFSX-2015PS", "Metashine REFSX-2025PS" and "REFSX-2040PS" can be mentioned.

In addition, glass flake particles formed of a flaky glass coated with metal by spattering can also be used For example, ones coated with saver available from Toyo Aluminium Co., Ltd. under the trade names of "Crystal Color GF2125", "Crystal Color GF2125-W", "Crystal Color GF2140", and "Crystal Color GF2140-M" can be mentioned. Also ones coated with nickel-chromium-molybdenum available from the same company under the trade names of "Crystal Color GF2525", "Crystal Color GF2525-M", "Crystal Color GF2540" and "Crystal Color GF2540-M" can be mentioned. Also, one coated with brass available from the same company under the trade name of "Crystal Color GF250", one coated with silver alloy available from the same company under the trade name of "Crystal Color GF1345", and one coated with titanium available from the same company under the trade name of "Crystal Color GF1445" can be mentioned.

In addition, as an example of metal coated inorganic particles to be used in the present invention, aluminum coated with iron(III) oxide can be used. For example, ones available from BASF AG under the trade names of "Paliocrom Gold L2000", "Paliocrom Gold L2002", "Paliocrom Gold L2020", "Paliocrom Gold L2022", "Paliocrom Gold L2025", and "Paliocrom Orange L2800" can be mentioned. In addition, mica coated with iron(III) oxide can also be used. For example, ones available from BASF AG under the trade names of "Paliocrom Red Gold L2500" and "Paliocrom Red L4000" can be mentioned. Moreover, mica-like iron(I) oxide coated with aluminum-manganese can be used. For example, ones available from BASF AG under the trade names of "Paliocrom Copper L3000" and "Paliocrom Copper L3001" can be mentioned. Mica coated with reduced titanium dioxide can also be used. For instance, ones available from BASF AG under the trade names of "Paliocrom Blue Silver L6000" and "Paliocrom Blue Silver L6001" can be mentioned. Moreover, mica coated with titanium dioxide can also be used.

Further, aluminum powders, as far as they are the scaly glittering particles having a median diameter of at least 10 μm, a ratio of smoothness on the particle surface to the said median diameter of not greater than 0.011, and a surface coating ratio of the said colorant on the particle surface of not greater than 80% in a state of dried written marks as above-mentioned, the color development of the colorant can be realized while maintaining the starry glitter on the written marks or coated films which the particles originally have.

The examples of such aluminum powders capable of providing the said parameter include the ones manufactured by Toyo Aluminium under the trade name of "WXM U75C" (median diameter: 13 μm), "WXM 5422" diameter: 18 μm), "WXM 1440" (median diameter: 30 μm), and "WXM 1415" (median diameter: 50 μm). In particular, as aluminum powders, "WXM 1440" (median dieter: 30 μm), and "WXM 1415" (median diameter: 50 μm) whose median diameter is not less than 30 μm, that is, with a median diameter exceeding 25μm can preferably be used.

Here, it is important for the said scaly glittering particles including these glass flake particles and metal coated inorganic particles to have a median diameter of at least 10 μm, preferably not less than 25 μm and most preferably not less than 30 μm. It is preferable to have a median of 100 μm at the maximum. The case in which the median diameter exceeds 100 μm is unfavorable because it does not come out of the pen tip easily when used as an ink for ball-point pens.

In addition, in the aqueous ink of the present invention, the said scaly glittering particles including glass flake particles and metal coated inorganic particles are preferably contained in 0.01–40% by weight relative to the total amount of the ink. When the content of the said scaly glittering particles is less than 0.01% by weight relative to the total amount of the ink, the glittering feeling becomes unsatisfactory. When the content of the said scaly glittering particles exceeds 40% by weight relative to the total amount of the ink, the viscosity of the ink becomes so high that the fluidity is reduced. The optimum content of the said scaly glittering particles ranges from 0.5–30% by weight.

(Water-soluble Organic Solvent)

Water-soluble organic solvents capable of preventing both drying at the pen tip of a ball-point pen and freezing of the ink are preferably used, which can be exemplified by glycols such as ethylene glycol, diethylene glycol, triethylone glycol, propylene glycol and polyethylene glycol, polyhydric alcohols such as glycerine, glycol ethers such as ethylene glycol monomethyl ether, diethylene glycol monomethyl ether, dipropylene glycol monomethyl ether and dipropylene glycol monopropyl ether. These organic solvents may be used alone or in combinations of two or more of them.

The content of the water-soluble organic solvent is preferably contained in 1.00–40% by weight relative to the total amount of the ink. When the content of the water-soluble organic solvent is less than 1.00% by weight relative to the total amount of the ink, the pen tip becomes susceptible to dry and the ink becomes liable to freeze. When the content of the water-soluble solvent exceeds 40% by weight relative to the total amount of the ink, written marks or coated films is difficult to dry out as well as solubility of the water-soluble resin being influenced. The optimum content of the water-soluble organic solvent, which varies depending on its type, ranges from 5.00–20% by weight.

(Colorant)

A colorant can be used in the present invention. The use of a colorant can adjust the ink colors to a variety of colors. It is important that such a colorant should be used as does not react with the said scaly glittering particles nor does it influence the color development (glittering feeling) of such scaly glittering particles. Moreover, colorants with high solubility and dispersability are favorable.

Examples include water-soluble dyes such as acid dyes, direct dyes and basic dyes, inorganic pigments such as carbon black and titanium oxide, organic pigments such as copper phthalocyanine pigments, threne pigments, azo pigments, quinacridon pigments, anthraquinone pigments, dioxane pigments, indigo pigments, thioindigo pigments, perinone pigments, perylene pigments, indolenone pigments and azomethine pigments, and fluorescent pigments, colored resin emulsions and the like can be mentioned. These also may be used in the form of a pigment dispersion. The present invention can use one species of pigment or can use two or more species of pigments in combination. In addition, several scaly glittering particles relating to this invention can be mixed and used Further, the scaly glittering particles relating to this invention and the conventional glittering pigments can be mixed and used. For example, the glass flake particles, metal coated inorganic particles, aluminum powder pigments, and pearlescent pigments and the like can be mixed. Furthermore, they can be mixed with opacifying pigments including a variety of inorganic or organic white pigments such as titanium oxide, alkylene bismelamine derivatives, plastic pigments (synthetic resin particle pigments) with opacifying power of various shapes including spherical shapes, oblate shapes and the like. The metal coated inorganic pigment also can be used together with the glass flake pigment.

Such a colorant need not be contained in the aqueous ink of the present invention. Even aqueous inks containing not colorants but glass flake pigments or metal coated inorganic pigments can provide high glittering feeling and high spatial effect to written marks or coated films. Also even aqueous inks not containing colorants but containing metal coated inorganic pigments can add high glittering feeling to written marks or coated films. The said aqueous inks containing colorants, however, are extremely preferable because they can provide a colored strong glittering feeling depending upon the hue or the like of the colorants contained.

The colorant is preferably contained in 0.01–30% by weight relative to the total amount of the ink. When the colorant is less than 0.01% by weight relative to the total amount of the ink, coloring by the colorant is difficult to be visually recognized. When the colorant exceeds 30% by weight in the total amount of the ink, the viscosity of the ink becomes so high that the fluidity becomes poor. The optimum amount of the colorant to be compounded, which varies depending on its type, ranges from 0.05–20% by weight.

(Water-soluble Resin)

As a water-soluble resin, preferably used is the water-soluble thickening resin which is capable of dispersing the scaly glittering parties and of preventing them from precipitation. In particular, in order to make a coating ratio of a colorant to the written marks of the said scaly glittering particles not greater than 80%, it is important to adjust the dispersion of the scaly glittering particles and the pigment particles and to adjust the viscosity of the said and as-will-be-seen pseudo-fluidity property (thixotropic property) respectively as a measure, and in this sense, it is important to contain this water-soluble resin in the ink.

Applicable as polysaccharides are microbial polysaccharides and derivatives thereof, including pullulan, xanthan gum, welan gum, rhamsan gum, succinoglucan and dextran; water-soluble polysaccharides derived from plants and derivatives thereof including tragacanth gum, gaux gum, tara gum, locust bean gum, ghatti gum, arabinogalactan gum, gum arabic, quince seed gum, pectin, starch, psyllium seed gum, pectin, carrageenan, alginic acid, agar and the like; water-soluble polysaccharides derived from animals and derivatives thereof including gelatin, casein and albumin. Moreover, N-vinylacetamide type resins such as N-vinylacetamide resin and crosslinked N-vinylacetamide resin can be used as the thickening resin.

In the present invention, the microbial polysaccharides and derivatives thereof can specifically and preferably be used among the said water-soluble resins. Such water-soluble resins can be used either alone or in combinations of two or more of them.

The water-soluble resin is preferably contained in 0.01–40% by weight relative to the total amount of the ink. If the content of the water-soluble resin is less than 0.01% by weight relative to the total amount of the ink, effect on preventing precipitation of the scaly glittering particles including glass flake particles, metal coated inorganic particles and the like becomes unsatisfactory. When the water-soluble resin exceeds 40% by weight relative to the total amount of the ink, the viscosity of the ink becomes so high that the fluidity becomes poor. The optimum amount of the water-soluble resin to be compounded, which varies depending on its type, ranges 0.05–20% by weight.

(Synthetic Resin Emulsion)

As previously mentioned, the present inventors have found that in order to obtain written marks of metallic luster color such as gold and silver and the like, the use of scaly glittering particles having a median diameter of at least 10 $\mu$m, a ratio of smoothness on the particle surface to a median diameter of not greater than 0.011, and a surface coating ratio of the said colorant in written marks of not greater than 80% together with the use of a colorant is preferable. The scaly glittering particles can provide, to written marks or coated films, glittering feeling and spatial effect higher than those with the conventional aluminum powder pigments and pearlescent pigments as well as providing the clear color development of the colorant.

However, they have also found that although an aqueous glittering ink containing a water-soluble thickening resin can increase the fixability of the glittering particles including glass flake pigments and the like by this water-soluble thickening resin, it is difficult to fix firmly the glittering particles including glass flake particles and the like to written marks or coated films since the sire of the scaly glittering particles is large having the median diameter of not less than 10 $\mu$m, preferably not less than 25 $\mu$m, and, more preferably not less than 30 $\mu$m. Accordingly, in the case of the aqueous ink containing glittering particles including glass flake particles, the glittering particles including glass flake pigments and the like are easily peeled by friction after writing or coating and it is difficult to maintain high glittering feeling and spatial effect to written marks or coated films Therefore, the durability of written marks or coated films having glittering feeling and spatial effect becomes poor.

From the above-mentioned situation, an important problem is to provide aqueous glittering inks which can improve the fixability of glittering particles including glass flake particles and the like to written marks or coated films and maintaining a higher glittering feeling and spatial effect for the written marks or coated films without deteriorating ink characteristics or writing characteristics and without inhibiting the effects on the high glittering feeling and spatial effect derived from compounding the glittering particles including glass flake particles and the like.

As a result of intensive studies for solving this problem, they have found that the problem can be solved by aqueous glittering inks containing glittering particles, a water-soluble thickening resin, a water-soluble organic solvent and water, and further containing a binder component which fixes the glass flake pigment to written marks or coated films.

On the other hand, another probable option for fixing such glittering particles to written mark or coated film is to use a water-soluble synthetic resin as a binder component. However, in the case of some water-soluble synthetic resins, if the contents thereof are set to be high in order to firmly fix the glittering particles with a large particle diameter as in the present invention, the solubility of the thickening resin and dispersability of the colorant are badly influenced. Moreover, there may be cases where viscoelasticity of the ink are greatly reduced, which leads to reduction in writing characteristics. Moreover, even if fixability to written marks or coated films is shown, aqueous inks should not be the ones wherein high glittering feeling and spatial effect of the glittering particles are contained but are poor in written marks or coated films.

The present inventors have made further intensive studies. As a result, they have found that the use of a synthetic resin emulsion as a binder component for fixing the glittering particles to written marks or coated films permits improvement in fixability of the glittering particles to written marks or coated films without influencing the solubility of water-soluble thickening resins, dispersability of colorants, viscoelasticity of ink, and coloring of ink and without inhibiting effects of high glittering feeling and spatial effect by compounding the glittering particles, and they have accomplished the present invention.

Accordingly, the aqueous ink of the present invention which contains a glittering particles with a large particle size is capable of improving the fixability of the glass ink pigment to written marks or coated films, forming written marks or coated film of durability, and maintaining a high glittering feeling and spatial effect for the written marks or coated films when it is put on a substrate such as paper, metal, plastics and textile fabrics by writing or coating. The reason for this is that the film formability of the synthetic resin emulsion is suitable for glittering particles including glass flake particles having a large-sized particle shape and the glittering particles can be fixed firmly to written marks or coated films without inhibiting the effects of high glittering feeling and spatial effect by compounding the glittering particles.

Moreover, since the binder component used in the present invention is not a water-soluble synthetic resin but a synthetic resin emulsion, it does not influence properties including solubility of the water-soluble thickening resin to be compounded together, dispersability of the colorant and viscoelasticity of the ink very much. The ink of the present invention therefore can improve the fixability of the glittering particles without influencing the viscoelasticity of the ink, writing characteristics and color of written marks or coated films.

From such facts, the aqueous glittering ink of the present invention containing the glittering particles can maintain, in written marks or coated films, a glittering feeling and spatial effect higher than those achieved by the conventional aqueous inks glittering pigments such as aluminum powder pigments and pearlescent pigments without deteriorating ink characteristics, writing performance or the like or without inhibiting the high surface smoothness inherent to glass.

The synthetic resin emulsion of the present invention is not specifically limited and any water-dispersive synthetic resin emulsion is available. Considering the ink characteristics and writing performance however, it is important to use the ones which do not influence solubility of water-soluble thickening resin, viscosity of the ink, dispersability of the colorant and coloring of the ink. Moreover, it is important not to inhibit the effect on the high glittering feeling and spatial effect caused by the composition of the glittering particles including glass flare particles and the like.

The minimum film forming temperature of the synthetic resin emulsion is preferably not higher than 20° C. If the minimum film forming temperature of the synthetic resin emulsion is not higher than 20° C., particularly not higher than 0° C., a film can be formed not only at room temperature (about 25° C.) but in a cold district and fixability of written marks or coated films to substrates can be improved.

Synthetic resin emulsions having an anionic property or a nonionic property preferably can be used. Such synthetic resin emulsions having the anionic property or the nonionic property can be prepared for example, by producing synthetic resins from anionic or nonionic monomers or using anionic or nonionic emulsifiers. If the synthetic resin emulsion has the anionic property or the nonionic property, the stability of the ink can be improved.

Preferred synthetic resin emulsions do not influence the dispersability of colorants or solubility of water-soluble thickening resin when the pH of inks is 6 or more.

From such a viewpoint, for example, acryl based synthetic resin emulsions, styrene-acryl based synthetic resin emulsions and vinyl acetate based synthetic resin emulsions can be used as a synthetic resin emulsion. Preferred examples of the acryl based synthetic resin include acrylate copolymer synthetic resin emulsions. Preferred examples of the styrene-acryl based synthetic resin emulsions include styrene-acrylate copolymer synthetic resin emulsions. As the vinyl acetate based synthetic resin emulsions, vinyl acetate synthetic resin emulsions and vinyl acetate-acrylate copolymer synthetic resin emulsions, for example, are preferably used. As the synthetic resin emulsion, one species of these synthetic resin can be used and also two or more species of these synthetic resins can be used in combination.

For example, the acryl based synthetic resin emulsion can be exemplified by the trade name "Nikasol FX336" (manufactured by Nippon Carbide Industries Co., Inc.; anionic; pH 7.5; minimum film forming temperature=0° C.), the trade name "Mowinyl DM772" (manufactured by Clariant Polymers Co., Ltd; anionic; pH 8.5; minimum film forming temperature=12–14° C.) and the trade name "Mowinyl 700" (manufactured by Clariant Polymers Co., Ltd; anionic; pH 8.0; minimum film forming temperature=5° C). The vinyl acetate based synthetic resin emulsion can be exemplified by the trade name "Nikasol TG134A7 (manufactured by Nippon Carbide Industries Co., Inc; pH 7.5; minimum film forming temperature=0° C.) and the trade name "Mowinyl 507" (manufactured by Clariant Polymers Co., Ltd; nonionic; pH 6.5; minimum film forming temperature=0° C.).

Although the content of the synthetic resin emulsion is not particularly specified, a preferable range is 0.01–40% by weight in solids relative to the total amount of the ink, for example. The content of the synthetic resin emulsion of less than 0.01% by weight in solids relative to the total amount of the ink results in reduction in fixability of the glittering particles including glass flake particles to written marks or coated films. If the content of the synthetic resin emulsion exceeds 40% by weight in solids relative to the total amount of the ink, the solids are so high that writing characteristics are deteriorated because of, for example, film formation at the pen tip. In addition, written marks or coated films are liable to whiten. In order to improve the fixability of the glittering particles including glass flake particles and the like to written marks or coated films further, the most desirable content of the synthetic resin emulsion is at least 0.3% by weight in solids relative to the total amount of the ink. Moreover, in order to improve writing characteristics further, the most desirable content of the synthetic resin emulsion is 20% by weight in solids relative to the total amount of the ink. That is, the optimum content of the synthetic resin emulsion is 0.3–20% by weight.

In addition, also in the case of the ink containing the synthetic resin emulsion as a binder component together with the glittering particles including glass flake particles, it is important that the resins can adjust viscosity of the ink and facilitate dispersion of the glass flake pigment and prevent its precipitation. Water-soluble thickening resin with a function to form a film of written marks or coated films can be used. For example, microbial polysaccharides and derivatives thereof can be used, including pullulan, xanthan gum, welan gum, rhamsan gum, succinoglucan and dextran. Water-soluble polysaccharides derived from plants and derivatives thereof also can be used, including tragacanth gum, guar gum, tara gum, locust bean gum, ghatti gum, arabinogalactan gum, gum arabic, quince seed gum, pectin, starch, psyllium seed gum, pectin, carrageenan, alginic acid and agar. Water-soluble polysaccharides derived from animals and derivatives thereof can also be used, including gelatin, casein and albumin.

As the water-soluble thickening resin, salts (sodium salts, ammonium salts and the like) of water-soluble resins (acryl based water-soluble resin, styrene-acryl based resins, styrene-maleic acid based resin and the like), water-dispersion type resins and the like can also be used.

In the case of inks which contain a synthetic resin emulsion as a binder component together with the glittering particles including glass flake particles, and the like, the microbial polysaccharides and derivatives thereof can be used preferably among the said water-soluble thickening resins. Such water-soluble thickening resins can be used either alone or in combinations of two or more of them.

In the case of inks which contain a synthetic resin emulsion as a binder component together with the glittering particles including glass flake particles, the water-soluble thickening resin is preferably contained in 0.01–40% by weight relative to the total amount of the ink. In the case where the water-soluble thickening resin is less than 0.01% by weight relative to the total amount of the ink, the glittering particles including glass flake particles are liable to precipitate. If the water-soluble thickening resin exceeds 40% by weight relative to the total amount of the ink in the case of the ink containing the synthetic resin emulsion, the viscosity of the ink becomes so high that the fluidity becomes poor and writing characteristics are deteriorated. The optimum amount of the water-soluble thickening resin to be compounded somewhat varies depending upon the type of the water-soluble thickening resin, but is 0.05–20% by weight.

Also in the case of the ink containing a synthetic resin emulsion as a binder component together with the glittering particles including glass flake particles and the like, water-soluble organic solvents which are capable of preventing both drying at the pen tip and freezing of the ink are preferably used, which can be exemplified by glycols such as ethylene glycol, diethylene glycol, triethylene glycol, propylene glycol and polyethylene glycol, polyhydric alcohols such as glycerin, and glycol ethers such as ethylene glycol monomethyl ether, diethylene glycol monomethyl ether, dipropylene glycol monomethyl ether and dipropylene glycol monopropyl ether, and the like. These organic solvents can be used either alone or in combination of two or more of them.

As for water-soluble organic solvents, aliphatic monohydric alcohols with 1 to 4 carbon atoms, aliphatic polyhydric alcohols such as glycerin, glycols such as propylene glycol and glycol ethers such as propylene glycol monomethyl ether and the like are preferably used.

Also in the case of the ink containing the synthetic resin emulsion as a binder component together with the glittering particles including glass flake particles and the like, the content of the water-soluble organic solvent is 1–40% by weight relative to the total amount of the ink. In the case where the content of the water-soluble organic test is less than 1% by weight relative to the total ink, a pen tip is liable to dry and the ink becomes liable to freeze. If the content of the water-soluble organic solvent exceeds 40% by weight relative to the total amount of the ink, the solubility of the water-soluble thickening resin is influenced and written marks and coated films become hard to dry. In the case of this ink, the optimum amount of the water-soluble organic solvent to be compounded varies depending upon the type of the water-soluble organic solvent, but is 5–30% by weight.

Also in the case of the ink containing the synthetic resin emulsion as a binder component together with the glittering particles including glass flake particles and the like, colorants can be used. The use of colorants can adjust the color of the ink to various colors. It is important to use colorants which do not react with the glittering particles including glass flake particles and do not influence the coloring of the glittering particles including glass flake particles. Moreover, the one excellent in solubility and dispersability are preferable as a colorant.

For example, water-soluble dyes such as acid dyes, direct dyes and basic dyes (triphenylmethane-type, xanthene-type, anthraquinone-type, metal complex-type, copper phthalacyanine-type and the like), organic pigments or inorganic solvents such as phthalocyanine, quinacridone, carbon black and titanium oxide, or fluorescent pigments, resin emulsions, colored resin emulsion and the like can be used. The colorant also can be compounded in the form of a pigment dispersion. The colorants can be used either alone or in combinations of two or more of them.

Also in the case of the ink containing the synthetic resin emulsion together with the glittering particles including glass flake particles and the like, colorants need not be contained. Even aqueous inks containing not colorants but the glittering particles including glass flake particles can add a high glittering feeling and high spatial effect to written marks or coated films. Each of the said aqueous inks containing colorants, however, is extremely preferable because they can provide high brilliance depending upon the hue or the like of the colorants contained.

In the case of the ink containing the synthetic resin emulsion as a binder component together with the glittering particles including glass flake particles, the content of the colorant is preferably 0.01–30% by weight relative to the total amount of the ink. When the colorant is less tan 0.01% by weight relative to the total amount of the ink, the coloring by the colorant becomes difficult to be visually recognized. When the colorant exceeds 30% by weight relative to the total amount of the ink, the viscosity of the ink becomes so high that the fluidity becomes poor and glittering feeling is deteriorated. The optimum amount of the colorant to be compounded, which varies depending on its type, is 0.05–20% by weight.

(Viscosity Range)

The viscosity range is not specifically limited but such an aqueous ink is preferable as mentioned above, having the pseudo-plasticity fluidity (thixotropic property) whose thixotropy index (T.I. value ) is not less than 1.3 represented by the ratio of V0.5 to V1.0 (V0.5/V1.0), wherein V0.5 is the viscosity with the rotation speed of 0.5 rpm and V1.0 is the viscosity with the rotation speed of 1.0 rpm when the ink is measured by an ELD-typed viscometer (3° R14 cone, at the temperature of 20° C.). Further, the aqueous ink having the pseudo-plasticity fluidity (thiiotropic property) with V0.5 of 1000~15000 mPa·s the viscosity when measured by an ELD-typed viscometer with a rotation speed of 0.5 rpm(3° R14 cone at the temperature of 20° C.) is preferable.

In addition, such an aqueous ink is preferable as having the pseudo-plasticity fluidity (thixotropic property) whose thixotropy index (T.I. value) is not less than 1.3 represented by the ratio of V0.5 to V1.0 (V0.5/V1.0), wherein V0.5 is the viscosity with the rotation speed of 0.5 rpm and V1.0 is the viscosity with the rotation speed of 1.0 rpm when the ink is measured by an ELD-typed viscometer (3° R14 cone, at the temperature of 20° C.) and having the pseudo-plasticity fluidity (thixotropic property) with V0.5 of 1000~15000 mPa·s, the viscosity when measured by an ELD-typed viscometer with a rotation speed of 0.5 rpm(3° R14 cone at the temperature of 20° C.).

Here, when V0.5, the viscosity with the rotation speed of 0.5 rpm measured by an ELD-typed viscometer (3° R14 cone, at the temperature of 20° C.) is less than 1000 mPa·s, since the viscosity is low in the case of the ink containing the said glittering particles relating to the present invention, the dispersal stability lowers, thereby causing precipitation over time and it is not preferable. On the other band, when V0.5 exceeds 15000 mPa·s, the viscosity becomes so high that the writing characteristics lowers particularly when used as the ink for ball-point pens.

(Other Additives)

Moreover, to the ink of the present invention can be compounded conventional water such as ion-exchange water. In addition, as needed, lubricants such as polyoxyethylene alkali metal salts, dicarboxylic amides, phosphates and N-oleyl sarcosine salts and the like, rust-inhibitors such as benzotriazole and tolyltriazole dicyclohexyl ammonium nitrate and the like, antiseptic mildew-proofing agents such as be benzoisothiazoline-type, pentachlorophenol-type and cresol and the like, and various surfactants can be added.

(Applications)

The aqueous glittering ink can be used in the fields of writing tools, printing, coating and cosmetics and the like. It is useful in a variety of applications as an aqueous glittering ink for writing tools (an aqueous glittering ink for ball-point pens and the like), an aqueous glittering ink for panting, an aqueous glittering ink for applicators (an aqueous glittering ink for coating and the like) and the like. It is particularly the most desirable as an aqueous glittering ink for ball-point pens.

(Method of Preparation)

The aqueous glittering ink of the present invention is not specifically limited but can be obtained, for example, by mixing and stirring ingredients such as water, a water-soluble organic solvent, a glass flake pigment and a colorant or a pigment base to disperse them, and thereafter charging a water-soluble resin and filtering the resulting mixture, and subsequently degassing. In particular, the ink containing the synthetic resin emulsion as a binder component together with the glittering particles is preferably prepared by the following process, although the preparation is not specifically limited. First, water, a water-soluble organic solvent, and, as needed, other additives are mixed and stirred, to the mixture is charged the glass flake pigment, and the resulting mixture is stirred; and thereafter a water-soluble thickening resin is added and stirred. Next, the pH of the mixed liquid is adjusted as needed, and a colorant is added and stirred, as needed. Subsequently, the synthetic resin emulsion is added and mixed.

As for these preparations, heretofore known dispersing techniques, degassing techniques, filtering techniques and the like can be adopted.

(Method of Forming the Written Marks and the Written Marks)

The method of forming the written marks of the aqueous ink in the present invention is not specifically limited, but such a writing method of the aqueous glittering ink is preferable as having scaly glittering particles with a median diameter of at least 10 μm, a ratio of smoothness on the particles space to the said median diameter of not greater than 0.011, and a surface coating ratio of the said colorant on the particle surface of not greater than 80% in a state of dried written marks, wherein the said scaly glittering particles are interspersed with a rate of not greater than 80% with respect to the total written surface and the said colorant's particles are interspersed among the said glittering particles.

FIG. 1 is the schematic sectional view showing the typical example of written marks when writing with the ink by the said writing method. As shown FIG. 1, in the embodiment of the present invention, the glittering particles 101 having the said property value are interspersed with the rate of not greater than 80% with respect to the written surface 10 on the surface of a sheet of paper 2 (a coated surface) and are capable of forming written marks 1 in which colorant's particles 103 are interspersed among glittering particles 101 and glittering particles 102. In written marks 1, when seen in a microscopic manner, the glittering particles 101 and 102 having the said property value are set on a sheet of paper 2 (coated surface) maintaining the smooth surface to the concave-convex surface constituting the said coated surface, further among the glittering pares 101 having this smooth surface and glittering particles 102 having this smooth surface, the colorant's particles 103 are interspersed as a particle group partially absorbed in a tissue of a sheet of paper 2. In the embodiment of the present invention, written marks are shown by the two types of glittering particles 101 and 102. As a matter of course, however, it is important to make such written marks wherein several glittering particles exist and the colorants are interspersed among glittering particles having the said property value and the particles group of the colorants are arranged. By adopting such writing method or forming method of the written marks, the glittering particles have several smooth areas with a variety of angles interspersed on the surface of written marks due to the concave-convex surface constituting the surface of a sheet of paper 2 (a coated surface). Moreover, since these glittering particles are the scaly glittering particles wherein the surface coating ratio of the said colorant on the particle surface is not greater than 80% in a state of dried written marks, there is little or no incidence of the light to the colorant's particles covering the surface of glittering particles 101 and 102. Therefore, without disturbing the reflected light to the respective smooth surface of the glittering particles, the indent light 31 and reflected light 32 of light 3 can be obtained depending on the smooth surface of the glittering particles. Moreover, as shown in the FIG. 1, since the incident light 31 and reflected light 32 of light 3 occur at a different angle to the respective smooth surfaces 111 and 112 of the glittering particles 101 and 102, by subtly changing the angle at which the written marks are seen at the eye's position the starry glitter is to be realized. Further, since the embodiment of the present invention refers to the written marks wherein the glittering particles having the said property value are interspersed with the rate of not greater than 80% to the total written surface on the surface of a sheet of paper (a coated surface) and the colorant's particles are interspersed among the glittering particles, the glittering feeling of the glittering particles and the color development of the colorant are maintained with good balance thereby providing the starry glitter and color development with each other synergistically. Here, when the glittering particles having the said property value are interspersed with the rate of exceeding 80% to the total written surface on a sheet of paper (a coated surface), even there are colorants existing among the several glittering particles, the color development of the said colorants is suppressed since the glittering feeling of the glittering particles exceeds the color development of the colorants on the written surface. Besides, the glittering feeling of the glittering particles appearing on the written surface is not determined visually, solely by the area in which the glittering particles occupy on the written surface, but rather, if these glittering particles occupy most of the total written surface, together with the lowering of the color development of the colorant's particles, the coloring surface of the glittering particles is to be formed and the glittering feeling lowers on the contrary. In other word, since the glittering feeling of the glittering particles is the visual feeling appearing synergistically in relation to the interspersion of the colorants existing among the glittering particles, it is also preferable to intersperse this glittering feeling with the rate of not greater than 80% to the total written surface in relation to the color development of the colorants. Here, in the present invention, the "interspersing rater" refers to the value (%) obtained by measuring the area of the glittering particles occupying the total written surface by using the microscope manufactured by ELIONIX INC. under the trade name of "ERA-8000" as already mentioned, thereby calculating the ratio. Here, it is more preferable for the scaly glittering particles of the present invention to be the particles wherein the surface coating ratio of the colorant on the particle surface is not greater than 40% in the state of dried written marks. In addition, it is the most suitable to intersperse these scaly glittering particles with the rate within the range of 20~45% to the total written surface.

By the way, the inventors have found that in the case of an aqueous ink which contains binder components fixing the said scaly glittering particles to written marks or coated films, while the resin component constituting the binder component fixes the scaly glittering particles to a written surface (a coated surface), it forms the resin film, directly covering the surface of the said glittering particles and that the resin film further forms the concave-convex, which impairs the glittering feeling of the glittering particles. The preferred embodiment of the present invention has found that when the concave-convex rate which the resin film has is not greater than 0.15 μm, the written marks can have a strong glittering feeling. In the present invention, the concave-convex rate refers to the average value of $R_{max}$ (μm), the maximum value of roughness measured on each surface of the several glittering particles which exist per unit area of the written marks or coated films in a state of dryness by using the microscope manufactured by ELIONIX INC. under the trade name of "ERA8000".

The glittering feeling of this scaly glittering particles is realized well with the starry glitter when the rate of the smoothness on the coated film (the smoothness on the written surface) is not less than 9 μm. When the rate of the smoothness on the coated film (the smoothness on the written surface) is less than 9 μm, as above-mentioned the gradient of the smooth surface of the glittering particles arranged on the written surface becomes small thereby making it difficult to receive the satisfactory glitter by changing the position to see these particles. Here, the "smoothness on the coated films" refers to the average value of $R_{max}$ (μm), the maximum value of roughness measured on each surface of the several glittering particles which exist per unit area of the written marks or coated films in a state of dryness by using the microscope manufactured by ELIONIX INC. under the trade name of "ERA-8000".

EXAMPLES

Aqueous glittering inks of the Examples and Comparative Examples provided by mixing and stirring ingredients including water, a water-soluble organic solvent, glittering particles and a colorant or a pigment base and the like in the compositions and amounts (parts by weight) given in Table 1 to disperse them, thereafter charging a water-soluble resin and filtering the resulting mixture, and subsequently degassing. In every preparation, heretofore known dispersing, degassing, filtering techniques and the like were used.

Likewise, aqueous glittering inks of other Examples and Comparative Examples were prepared by mixing and stirring ingredients including water, a water-soluble organic solvent, glittering parties, and the like in the compositions and amounts (arts by weight) given in Table 2 to disperse them, thereafter charging a water-soluble resin and filtering the resulting mixture, and subsequently degassing. In every preparation, heretofore known dispersing, degassing, filtering techniques and the like were used.

In the same manner as previously mentioned, aqueous glittering inks of other Examples and Comparative Examples were prepared by mixing and stirring ingredients including glittering particles, water, a water-soluble organic solvent and the like in the compositions and amounts (parts by weight) given in Tables 3–8 to disperse them, thereafter charging a water-soluble resin and filtering the resulting mixture, and subsequently degassing. In every preparation, heretofore known dispersing, degassing, filtering techniques and the like were used.

For information, a colored emulsion containing a fluorescent pigment is used as a colorant in Examples in Table 6.

TABLE 1

(Parts by weight)

| | | Examples | | | | | Comparative Examples | |
|---|---|---|---|---|---|---|---|---|
| | | 1 | 2 | 3 | 4 | 5 | 1 | 2 |
| Glittering particles | ① | 7.0 | — | 7.0 | — | — | — | — |
| | ② | — | 5.0 | — | 5.0 | 10.0 | — | — |
| | ⑤ | — | — | — | — | — | 5.0 | — |
| | ⑥ | — | — | — | — | — | — | 10.0 |
| Water-soluble resin | ① | 0.3 | 0.3 | — | — | — | 0.3 | — |
| | ② | — | — | 0.3 | 0.3 | 0.2 | — | 0.3 |
| Colorant | ① | 1.0 | 1.0 | — | — | — | — | — |
| | ② | — | — | — | — | 2.0 | — | — |
| Pigment base | ① | — | — | 20.0 | 20.0 | — | — | — |
| Water-soluble organic solvent | ① | 5.0 | 5.0 | 5.0 | 5.0 | — | 5.0 | 5.0 |
| | ② | — | — | — | — | 7.0 | — | — |
| | ③ | — | — | — | — | 14.0 | — | — |
| Antiseptic mildew-proofing agent | ① | 0.1 | 0.1 | 0.1 | 0.1 | 0.1 | 0.1 | 0.1 |
| Rust-inhibitor | | 0.1 | 0.1 | 0.1 | 0.1 | 0.1 | 0.1 | 0.1 |
| Lubricant | | 1.2 | 1.2 | 1.2 | 1.2 | 1.2 | 1.2 | 1.2 |
| Water | | 85.3 | 87.3 | 66.3 | 68.3 | 65.4 | 88.3 | 83.3 |
| Evaluation test | | | | | | | | |
| Glittering feeling | | ○ | ○ | ○ | ○ | ○ | x | x |
| Spatial effect | | ○ | ○ | ○ | ○ | ○ | x | x |
| Writing performance | | ○ | ○ | ○ | ○ | ○ | ○ | ○ |

TABLE 2

(Parts by weight)

| | | Examples | | | | | Comparative Examples |
|---|---|---|---|---|---|---|---|
| | | 6 | 7 | 8 | 9 | 10 | 3 |
| Glittering particles | ⑦ | 7.0 | — | 7.0 | — | 7.0 | — |
| | ⑧ | — | 5.0 | — | 5.0 | — | — |
| | ① | — | — | — | — | — | 7.0 |
| Water-soluble resin | ① | 0.3 | 0.3 | — | — | — | — |
| | ② | — | — | 0.3 | 0.3 | 0.2 | 0.3 |
| | ③ | — | — | — | — | — | 3.0 |
| Water-soluble organic solvent | ① | 5.0 | 5.0 | 5.0 | 5.0 | — | 5.0 |
| | ② | — | — | — | — | 7.0 | — |
| | ③ | — | — | — | — | 14.0 | — |
| Colorant | ② | — | — | — | — | 2.0 | — |
| Pigment base | ② | — | — | — | — | — | 40.0 |
| Antiseptic mildew-proofing agent | ① | 0.1 | 0.1 | 0.1 | 0.1 | 0.1 | 0.1 |

TABLE 2-continued (Parts by weight)

| | | Examples | | | | | Comparative Examples |
|---|---|---|---|---|---|---|---|
| | | 6 | 7 | 8 | 9 | 10 | 3 |
| Rust-inhibitor | | 0.1 | 0.1 | 0.1 | 0.1 | 0.1 | 0.1 |
| Lubricant | | 1.2 | 1.2 | 1.2 | 1.2 | 1.2 | 1.2 |
| Water | | 86.3 | 88.3 | 86.3 | 88.3 | 68.4 | 43.3 |
| Evaluation test | Glittering feeling | ○ | ○ | ○ | ○ | ○ | X |
| | Writing performance | ○ | ○ | ○ | ○ | ○ | ○ |

TABLE 3

(Parts by weight)

| | | Examples | | | | |
|---|---|---|---|---|---|---|
| | | 11 | 12 | 13 | 14 | 15 |
| Glittering particles | ③ | 7.0 | — | 7.0 | — | — |
| | ④ | — | 5.0 | — | 5.0 | 10.0 |
| Water-soluble resin | ① | 0.3 | 0.3 | — | — | — |
| | ② | — | — | 0.3 | 0.3 | 0.2 |
| Colorant | ① | 1.0 | 1.0 | — | — | — |
| | ② | — | — | — | — | 2.0 |
| Pigment base | ① | — | — | 20.0 | 20.0 | — |
| Water-soluble organic solvent | ① | 5.0 | 5.0 | 5.0 | 5.0 | — |
| | ② | — | — | — | — | 7.0 |
| | ③ | — | — | — | — | 14.0 |
| Antiseptic mildew-proofing agent | ① | 0.1 | 0.1 | 0.1 | 0.1 | 0.1 |
| Rust-inhibitor | | 0.1 | 0.1 | 0.1 | 0.1 | 0.1 |
| Lubricant | | 1.2 | 1.2 | 1.2 | 1.2 | 1.2 |
| Water | | 85.3 | 87.3 | 66.3 | 68.3 | 65.4 |
| Evaluation test | Glittering feeling | ○ | ○ | ○ | ○ | ○ |
| | Spatial effect | ○ | ○ | ○ | ○ | ○ |
| | Writing performance | ○ | ○ | ○ | ○ | ○ |

TABLE 4

(Parts by weight)

| | | Examples | | | | Comparative Examples | |
|---|---|---|---|---|---|---|---|
| | | 16 | 17 | 18 | 19 | 4 | 5 |
| Glittering particles | ① | 0.01 | — | — | 40.0 | 0.005 | 50.0 |
| | ④ | — | 0.5 | 30.0 | — | — | — |
| Water-soluble resin | ① | 0.3 | 0.3 | — | — | 0.3 | 0.3 |
| | ② | — | — | 0.3 | 0.3 | — | — |
| Colorant | ① | 1.0 | 1.0 | 1.0 | 2.0 | — | 2.0 |
| Water-soluble organic solvent | ① | 5.0 | 5.0 | 5.0 | 5.0 | 5.0 | 5.0 |
| Antiseptic mildew-proofing agent | ① | 0.1 | 0.1 | 0.1 | 0.1 | 0.1 | 0.1 |

TABLE 4-continued (Parts by weight)

|  |  | Examples | | | | Comparative Examples | |
|---|---|---|---|---|---|---|---|
|  |  | 16 | 17 | 18 | 19 | 4 | 5 |
| Rust-inhibitor |  | 0.1 | 0.1 | 0.1 | 0.1 | 0.1 | 0.1 |
| Lubricant |  | 1.2 | 1.2 | 1.2 | 1.2 | 1.2 | 1.2 |
| Water |  | 92.29 | 91.8 | 92.3 | 51.3 | 93.295 | 41.3 |
| Evaluation test | Glittering feeling | ○ | ○ | ○ | ○ | X | ○ |
|  | Spatial effect | ○ | ○ | ○ | ○ | X | ○ |
|  | Writing performance | ○ | ○ | ○ | ○ | ○ | X |

TABLE 5

(Parts by weight)

|  |  | Examples | | | | Comparative Examples | |
|---|---|---|---|---|---|---|---|
|  |  | 20 | 21 | 22 | 23 | 6 | 7 |
| Glittering particles | ③ | 0.01 | — | — | 40.0 | 0.005 | 50.0 |
|  | ④ | — | 0.5 | 30.0 | — | — | — |
| Water-soluble resin | ① | 0.3 | 0.3 | — | — | 0.3 | 0.3 |
|  | ② | — | — | 0.3 | 0.8 | — | — |
| Water-soluble organic solvent | ① | 5.0 | 5.0 | 5.0 | 5.0 | 5.0 | 5.0 |
| Antiseptic mildew-proofing agent | ① | 0.1 | 0.1 | 0.1 | 0.1 | 0.1 | 0.1 |
| Rust-inhibitor |  | 0.1 | 0.1 | 0.1 | 0.1 | 0.1 | 0.1 |
| Lubricant |  | 1.2 | 1.2 | 1.2 | 1.2 | 1.2 | 1.2 |
| Water |  | 93.29 | 92.8 | 63.3 | 53.3 | 93.295 | 43.3 |
| Evaluation test | Glittering feeling | ○ | ○ | ○ | ○ | X | ○ |
|  | Writing performance | ○ | ○ | ○ | ○ | ○ | X |

TABLE 6

(Parts by weight)

|  |  | Examples | | | | | | |
|---|---|---|---|---|---|---|---|---|
|  |  | 24 | 25 | 26 | 27 | 28 | 29 | 30 |
| Glittering particles | ① | 5.0 | 5.0 | — | — | — | — | — |
|  | ② | — | — | 5.0 | — | — | — | — |
|  | ③ | — | — | — | 5.0 | — | — | — |
|  | ④ | — | — | — | — | 5.0 | — | — |
|  | ⑦ | — | — | — | — | — | 5.0 | — |
|  | ⑧ | — | — | — | — | — | — | 5.0 |
| Water-soluble resin | ① | 0.3 | 0.3 | — | — | — | 0.3 | — |
|  | ② | — | — | 0.3 | 0.3 | 0.3 | — | 0.3 |
| Colorant | ⑤ | 1.0 | — | 1.0 | 1.0 | — | 1.0 | 1.0 |
|  | ⑥ | — | 1.0 | — | — | 1.0 | — | — |
| Water-soluble organic solvent | ① | 5.0 | 5.0 | 5.0 | 5.0 | 5.0 | 5.0 | 5.0 |
| Antiseptic mildew-proofing agent | ① | 0.1 | 0.1 | 0.1 | 0.1 | 0.1 | 0.1 | 0.1 |
| Rust-inhibitor |  | 0.1 | 0.1 | 0.1 | 0.1 | 0.1 | 0.1 | 0.1 |
| Lubricant |  | 1.2 | 1.2 | 1.2 | 1.2 | 1.2 | 1.2 | 1.2 |
| Water |  | 87.3 | 87.3 | 87.3 | 87.3 | 87.3 | 87.3 | 87.3 |

TABLE 6-continued (Parts by weight)

|  | Examples | | | | | | |
|---|---|---|---|---|---|---|---|
|  | 24 | 25 | 26 | 27 | 28 | 29 | 30 |
| Evaluation test |  |  |  |  |  |  |  |
| Glittering feeling | ○ | ○ | ○ | ○ | ○ | ○ | ○ |
| Spatial effect | ○ | ○ | ○ | ○ | ○ | — | — |
| Writing performance | ○ | ○ | ○ | ○ | ○ | ○ | ○ |

TABLE 7

(Parts by weight)

|  |  | Examples | | | |
|---|---|---|---|---|---|
|  |  | 31 | 32 | 33 | 34 |
| Glittering particles | ① | 7.0 | — | 7.0 | — |
|  | ② | — | 5.0 | — | 5.0 |
|  | ⑤ | — | — | — | — |
|  | ⑥ | — | — | — | — |
| Water-soluble resin | ④ | 0.3 | — | — | 0.2 |
|  | ⑤ | — | 0.3 | — | 0.1 |
|  | ⑥ | — | — | 0.3 | — |
| Colorant | ① | 1.0 | 1.0 | — | — |
|  | ② | — | — | — | — |
| Pigment base | ① | — | — | 20.0 | 20.0 |
| Water-soluble organic solvent | ① | 5.0 | 5.0 | 5.0 | 5.0 |
|  | ② | — | — | — | — |
|  | ③ | — | — | — | — |
| Antiseptic mildew-proofing agent | ① | 0.1 | 0.1 | 0.1 | 0.1 |
| Rust-inhibitor |  | 0.1 | 0.1 | 0.1 | 0.1 |
| Lubricant |  | 1.2 | 1.2 | 1.2 | 1.2 |
| Water |  | 85.3 | 87.8 | 66.3 | 68.3 |
| Evaluation test | Glittering feeling | ○ | ○ | ○ | ○ |
|  | Spatial effect | ○ | ○ | ○ | ○ |
|  | Writing performance | ○ | ○ | ○ | ○ |

TABLE 8

(Parts by weight)

|  |  | Examples | | | | | |
|---|---|---|---|---|---|---|---|
|  |  | 35 | 36 | 37 | 38 | 39 | 40 |
| Glittering particles | ① | 5.0 | 5.0 | 5.0 | — | — | — |
|  | ② | — | — | — | 5.0 | 5.0 | 5.0 |
|  | ⑤ | 5.0 | — | 5.0 | — | 5.0 | — |
|  | ⑥ | — | 5.0 | — | 5.0 | — | 5.0 |
| Water-soluble resin | ① | 0.3 | 0.3 | 0.3 | 0.3 | 0.3 | 0.3 |
| Pigment base | ③ | — | — | 20.0 | — | — | 20.0 |
| Water-soluble organic solvent | ① | 5.0 | 5.0 | 5.0 | 5.0 | 5.0 | 5.0 |
| Antiseptic mildew-proofing agent | ① | 0.1 | 0.1 | 0.1 | 0.1 | 0.1 | 0.1 |

TABLE 8-continued

| | | (Parts by weight) Examples | | | | | |
|---|---|---|---|---|---|---|---|
| | | 35 | 36 | 37 | 38 | 39 | 40 |
| Rust-inhibitor | | 0.1 | 0.1 | 0.1 | 0.1 | 0.1 | 0.1 |
| Lubricant | | 1.2 | 1.2 | 1.2 | 1.2 | 1.2 | 1.2 |
| Water | | 83.3 | 83.3 | 68.8 | 83.3 | 83.3 | 68.3 |
| Evaluation test | Glittering feeling | ○ | ○ | ○ | ○ | ○ | ○ |
| | Spatial effect | ○ | ○ | ○ | ○ | ○ | ○ |
| | Writing performance | ○ | ○ | ○ | ○ | ○ | ○ |

Example 41

An aqueous glittering ink of Example 41 was obtained in the composition and amounts (parts by weight) given in Table 9 by the following method of preparation with regard to compounding of the synthetic resin emulsion. That is, water, a water-soluble organic solvent and, as needed, other additives are mixed and stirred; glittering particles are charged to the resultant and stirred; and thereafter a water-soluble thickening resin is added and stirred. Next, the pH of the mixed liquid is adjusted as needed, and a colorant is added and stir as needed. Subsequently, a synthetic resin emulsion is added and mixed.

In this preparation, heretofore known dispersing, degassing, filtering techniques and the like were adopted. In the foregoing producing process, the pH was adjusted to 8.5 with caustic soda.

Examples 42–49

Aqueous glittering inks of Examples 42–49 were prepared in the same manner as Example 41 except for using the compositions and amounts (parts by weight) given in Tables 9 and 10.

Comparative Examples 8–14

Aqueous glittering inks of Comparative Examples 8–14 were prepared in the same manner as Example 41 except for using the compositions and amounts (parts by weight) given in Tables 9 and 10.

For information, in Examples 42–49 and Comparative Examples 8–14 used, heretofore known dispersing, degassing, filtering techniques and the like were adopted.

TABLE 9

| | | (Parts by weight) | | | | | | | |
|---|---|---|---|---|---|---|---|---|---|
| | | Examples | | | | | Comparative Examples | | |
| | | 41 | 42 | 43 | 44 | 45 | 8 | 9 | 10 |
| Glass flake particles | ④ | 5.0 | 5.0 | 5.0 | 5.0 | 5.0 | 5.0 | 5.0 | 5.0 |
| Water-soluble thickening resin | ④ ⑤ | 0.2 0.1 | 0.2 0.1 | 0.2 0.1 | 0.2 0.1 | 0.2 0.1 | 0.2 0.1 | 0.2 0.1 | 0.2 0.1 |
| Binder component (solids) | ① | 7.5 | | | | | | | |
| | ② | | 7.5 | | | | | | |
| | ③ | | | 7.5 | | | | | |
| | ④ | | | | 7.5 | | | | |
| | ⑤ | | | | | 7.5 | | | |
| | ⑥ | | | | | | | 2.0 | 15.0 |
| Water-soluble organic solvent | ① ④ | 7.0 15.0 | 7.0 15.0 | 7.0 15.0 | 7.0 15.0 | 7.0 15.0 | 7.0 15.0 | 7.0 15.0 | 7.0 15.0 |
| Pigment base | ① | 2.0 | 2.0 | 2.0 | 2.0 | 2.0 | 2.0 | 2.0 | 2.0 |
| Antiseptic mildew-proofing agent | ① | 0.1 | 0.1 | 0.1 | 0.1 | 0.1 | 0.1 | 0.1 | 0.1 |
| Lubricant | | 0.1 | 0.1 | 0.1 | 0.1 | 0.1 | 0.1 | 0.1 | 0.1 |
| Water | | 63.0 | 63.0 | 63.0 | 63.0 | 63.0 | 70.5 | 68.5 | 55.5 |
| Fixability | | ○ | ○ | ○ | ○ | ○ | x | x | ○ |
| Writing aptitude | | ○ | ○ | ○ | ○ | ○ | ○ | ○ | x |
| Glittering feeling | | ○ | ○ | ○ | ○ | ○ | ○ | ○ | ○ |
| Spatial effect | | ○ | ○ | ○ | ○ | ○ | ○ | ○ | ○ |

Note) The binder component is indicated by a content of solids (parts by weight).

TABLE 10

| | | (Parts by weight) | | | | | | | |
|---|---|---|---|---|---|---|---|---|---|
| | | Examples | | | | Comparative Examples | | | |
| | | 46 | 47 | 48 | 49 | 11 | 12 | 13 | 14 |
| Glass flake particles | ④ | 5.0 | 0.5 | 30 | 5.0 | 5.0 | 5.0 | 0.01 | 50 |
| Water-soluble thickening resin | ④ ⑤ | 0.2 0.1 | 0.2 0.1 | 0.2 0.1 | 0.2 0.1 | 0.2 0.1 | 0.2 0.1 | 0.2 0.1 | 0.2 0.1 |

TABLE 10-continued

|  |  | (Parts by weight) | | | | | | | |
|---|---|---|---|---|---|---|---|---|---|
|  |  | Examples | | | | Comparative Examples | | | |
|  |  | 46 | 47 | 48 | 49 | 11 | 12 | 13 | 14 |
| Binder | ① | 40 |  |  | 0.01 | 0.005 | 45 |  |  |
| component | ② |  | 7.5 | 7.5 |  |  |  | 7.5 | 7.5 |
| (solids) |  |  |  |  |  |  |  |  |  |
| Water-soluble | ① | 7.0 | 7.0 | 7.0 | 7.0 | 7.0 | 7.0 | 7.0 | 7.0 |
| organic solvent | ④ | 15.0 | 15.0 | 15.0 | 15.0 | 15.0 | 15.0 | 15.0 | 15.0 |
| Pigment base | ① | 2.0 | 2.0 | 2.0 | 2.0 | 2.0 | 2.0 | 2.0 | 2.0 |
| Antiseptic mildew-proofing agent | ① | 0.1 | 0.1 | 0.1 | 0.1 | 0.1 | 0.1 | 0.1 | 0.1 |
| Lubricant |  | 0.1 | 0.1 | 0.1 | 0.1 | 0.1 | 0.1 | 0.1 | 0.1 |
| Water |  | 30.5 | 67.5 | 38.0 | 70.49 | 70.495 | 25.5 | 67.99 | 18.0 |
| Fixability |  | ○ | ○ | ○ | ○ | x | ○ | ○ | ○ |
| Writing aptitude |  | ○ | ○ | ○ | ○ | ○ | x | ○ | x |
| Glittering feeling |  | ○ | ○ | ○ | ○ | ○ | x | x | ○ |
| Spatial effect |  | ○ | ○ | ○ | ○ | ○ | x | x | ○ |

Note) The binder component is indicated by a content of solids (parts by weight).

In Tables 1–10, each raw material composition is as follows:

(Glittering Particles)
① Glass Flake Parties: Trade name "Crystal Color GF2525-M", manufactured by Toyo Album Co., Ltd, median diameter=about 25 μm
② Glass Flake Particles: Trade name "Crystal Color GF2540", manufactured by Toyo Aluminum Co., Ltd, median diameter=about 40 μm
③ Glass Flake Particles: Trade name "Metashine REFSX-2025PS", manufactured by Toyo Aluminium Co., Ltd., median diameter=about 25 μm
④ Glass Flake Particles: Trade name "Metashine REFSX-2040PS", manufactured by Toyo Aluminum Co., Ltd., median diameter=about 40 μm
⑤ Aluminum powder: trade name "WXM0630", manufactured by Toyo Aluminium Co., Ltd., average particle size=about 5 μm
⑥ Pearlescent pigment: trade name "Iriodin 302", manufactured by Merck Japan Limited, average particle size= about 5–20 μm
⑦ Metal coated inorganic particles (yellow): trade name "Paliocrom Gold L2002", manufactured by BASF AG, median diameter =about 20 μm
⑧ Metal coated inorganic particles (yellow): trade name "Paliocrom Gold L2022", manufactured by BASF AG, median diameter=about 16 μm (Water-soluble Resin)
① Rhamsan gum: trade name "K7C233", manufactured by Sansho Co., Ltd
② Welan gum: trade name "K1C376", manufactured by Sansho Co., Ltd
③ Carboxymethyl cellulose (CMC): trade "name Cellogen 7A", number average molecular weight=27000–33000, manufactured by Dai-ichi Kogyo Seiyaku Co., Ltd.
④ Xanthan gum: trade name "Kelzan", manufactured by Kelco a unit of Monsanto Company.
⑤ Polyacrylic acid: trade name "Carbopol 940", manufactured by BF Goodrich Co., Ltd.
⑥ Succinoglycan: trade name "Reozan", manufactured by Sansho Co., Ltd (Water-soluble Organic Solvent)
① Glycerin
② Dipropylene glycol monopropyl ether
③ Dipropylene glycol monomethyl ether
④ Propylene glycol (Binder Component/Fixing Agent)
① Acrylic synthetic resin emulsion: trade name "Nikasol FX336", manufactured by Nihon Carbide Co., Ltd.; anionic property; pH 7.5; minimum film forming temperature 0° C.
② Vinyl acetate synthetic emulsion: trade name "Nikasol TG134A" manufactured by Nihon Carbide Co., Ltd. pH 7.5; minimum film forming temperature 0° C.
③ Vinyl acetate synthetic emulsion: trade name "Mowinyl 507" manufactured by Clariant Polymer Co., Ltd. non-ionic property; pH 6.5; minimum film forming temperature 0° C.
④ Acrylic ester copolymer resin emulsion: trade name "Mowinyl DM772" manufactured by Clariant Polymer Co., Ltd anionic property, pH 8.5; minimum film forming temperature 12~14° C.
⑤ Acrylic ester copolymer resin emulsion: trade name "Mowinyl 700" manufactured by Clariant Polymer Co., Ltd anionic property; pH 8.0; minimum film forming temperature 5° C.
⑥ Methyl cellulose: trade name "Seska MC25S" manufactured by Daiichi Kogyo Seiyaku Co., Ltd.

(Colorant)
① Yellow dye: trade name "Yellow 202 (1)", Acid Yellow 73, Aizen Co., Ltd.
② Red dye: trade name "Chugai Aminol First pink R", xanthen-type, manufactured by Chugai Kasei Co., Ltd.
③ Blue pigment: trade name "Firstgen Blue TGR", phthalocyanine blue, manufactured by Dainippon Ink & Chemicals, Inc.
④ Yellow pigment: trade name "Seikafast Yellow A-3", azo-type, manufactured by Dainichiseika Color & Chemicals Mfg. Co., Ltd.
⑤ Yellow resin emulsion: trade name "LUMIKOL NKW-2105", yellow fluorescent pigment, manufactured by Nippon Keiko Kagaku CO., Ltd.
⑥ Blue resin emulsion: trade name "LUMIKOL NKW-2108", blue fluorescent pigment, manufactured by Nippon Keiko Kagaku CO., Ltd.
⑦ White pigment: trade name "Kronos-KR380", titanium oxide, manufactured by Titan Kogyo CO., LTD.

(Pigment Base)

①　Pigment base: A pigment dispersion of a pigment base was obtained, in the form of a water dispersion of pigment (average particle size=0.08 μm; solid content=10% by weight), by adding and dissolving triethylamine to a mixture obtained by mixing the above-mentioned blue pigment ③ and the following resin for dispersing pigment in the following proportion, and thereafter conducting dispersion with a ball mill. As the resin for dispersing pigment a styrene-acryl copolymer was used (trade name "JOHNCRYL J683", Johnson Polymer Co., Ltd., weight average molecular weight=8000).

Blue pigment ③ 5 parts by weight

Resin for dispersing pigment 1 part by weight

②　Pigment base: A pigment dispersion of a pigment base was obtained, in the form of a water dispersion of pigment (average particle size=0.08 μm; solid content=10% by weight), by adding and dissolving triethylamine to a mixture obtained by mixing the above-mentioned yellow pigment ④ and the following resin for dispersing pigment in the following proportion, and thereafter conducting dispersion with a ball mill. As the resin for dispersing pigment was used a styrene-acryl copolymer (trade name "JOHNCRYL J683", Johnson Polymer Co., Ltd., weight average molecular weight=8000).

Yellow pigment ④ 5 parts by weight

Resin for dispersing pigment 1 part by weight

③　Pigment base: A pigment dispersion of a pigment base was obtained, in the form of a water dispersion of pigment (average particle size=0.4 μm; solid content=10% by weight), by adding and dissolving triethylamine to a mixture obtained by mixing the above-mentioned white pigment ⑦ and the following resin for dispersing pigment in the following proportion, and thereafter conducting dispersion with a ball mill. As the resin for dispersing pigment is used a styrene-acryl copolymer (trade mane "JOHNCRYL J683", Johnson Polymer Co., Ltd, weight average molecular weight =8000).

White pigment ⑦ 5 parts by weight

Resin for dispersing pigment 1 part by weight (Antiseptic Mildew-Proofing Agent)

①　1,2-Benzoisothiazolin-3-one (trade name "Proxell GXL", Hoechst Synthesis Co., Ltd.)

(Rust-Inhibitor)

Benzotriazole (Lubricant)

Maleic monoamide (Preparation of Test Samples)

Next, each of the inks of Examples and Comparative Examples given in Tables 1–10 was packed into an ink container made of a hollow polypropylene tube equipped with a ball-point pen tip made of stainless steel (ball material: silicon carbide), and ball-point pens of test samples having the ink containers therein were prepared. The diameter of a ball is 1.0 mm.

(Evaluation Test)

The glittering feeling and spatial effect of each ink for the Examples and Comparative Examples given in Table 1 and the glittering feeling of each ink for the Examples and Comparative Examples given in Table 2 were evaluated by writing on commercially available loose-leaf sheets with these ball-point pens. The glittering feeling and spatial effect of each ink for the Examples and Comparative Examples given in Tables 3–4, the glittering feeling of each ink for the Examples and Comparative Examples given in Table 5, the glittering feeling and spatial effect of the ink for Example 28 given Table 6 and the glittering feeling of each ink for Examples 29 and 30 given in Table 6 were evaluated. The glittering feeling and spatial effect of each ink wherein other water-soluble resins were incorporated were evaluated for Examples 31–34 given in Table 7. The glittering feeling and spatial effect of each ink were evaluated for Examples 35–40 given in Table 8. Also, the writing performance was evaluated for each Example and each Comparative Example given in Tables 1–8. The glittering feeling, spatial effect and furthermore fixability and writing aptitude were evaluated for each ink of Examples 41–49 containing resin emulsions given in Tables 9 and 10.

(Evaluation of Glittering Feeling)

Evaluation of the glittering feeling was conducted by visual observation of writings. Rating criteria were: ○ for ones having strong glittering feeling; x for ones having little or no glittering feeling.

(Evaluation of Spatial Effect)

Evaluation of the spatial effect also was conducted by visual observation. Rating criteria were: ○ for ones having spatial effect; x for ones having no spatial effect.

(Evaluation of Writing Performance)

The writing performance was evaluated according to feeling in writing. Rating criteria were: ○ for ones having good writing performance and permitting smooth writing; x for ones having poor writing performance and not permitting smooth writing very much.

(Test of Fixability)

The fixability shown in Tables 9 and 10 was evaluated according to the following criteria by writing on commercially available loose-leaf sheets with ball-point pens of test samples according to every Example and Comparative Example, drying the written marks, thereafter adhering commercially available adhesive cellophane tapes thereon, and then visually observing conditions after peeling the tapes.

○: Glittering particles remain on the written mark and the glittering feeling before peeling of the cellophane tape has not been lost.

x: Glittering particles are peeled from the written mark and the glittering feeling before peeling of the cellophane tape has been lost.

(Test of Writing Characteristics)

The writing characteristics shown in Tables 9 and 10 were evaluated by writing on commercially available loose-leaf sheets with ball-point pens of test samples according to every Example and Comparative Example, and rating writing feeling according to the following criteria.

○: Writing feeling is smooth.

x: Writing feeling is heavy and the ink does not flow. A double-line written mark was obtained.

Tables 1–10 show results of glittering feeling, spatial effect and writing performance in each Example and each Comparative ample.

From Table 1, Examples 1 and 2 provided written marks having both a strong glittering feeling like sunshine and strong spatial effect. Examples 3 and 4 provided written marks having a strong glittering feeling like stars twinkling in the night sky and strong spatial effect. Example 5 provided coated films with a glittering feeling and spatial effect inside and a double-colored red written mark outside. On the ether hand, Comparative Examples 1 and 2 provided written marks having weak glittering feeling but having no spatial effect. Writing performances of the inks of Examples 1–5 were good as in Comparative Examples 1 and 2.

From Table 2, Examples 6–9 containing metal coated inorganic particles as glittering particles provided golden written marks with strong glittering feeling. Likewise, Example 10 containing metal coated inorganic particles as glittering particles provided coated films having glittering feeling inside and a double-colored red written mark. On the other hand, Comparative Example 3 containing conventional aluminum powder particles as glittering particles provided a golden metallic written mark having poor and weak glittering feeling. Writing performances of the inks of Examples 6–10 were good as in Comparative Example 3.

The inks of Examples 1–5 containing glass flake particles can provide written marks with an unprecedented unique feeling since these inks can provide written marks with both a strong glittering feeling and strong spatial effect by comprising glass flake particles and colorants instead of using glittering pigments as in Comparative Examples 1–2.

The inks of Examples 6–10 containing metallic coated inorganic particles as glittering particles cannot provide strong spatial effect but can provide written marks or coated films having a strong glittering feeling without loosing glitter in comparison to the ink of Comparative Example 3.

From Table 3, the inks of Examples 11 and 12 containing glass flake particles provided written marks having a strong glittering feeling like sunshine and strong spatial effect as in the inks of Examples 1 and 2. The inks of Examples 13 and 14 provided written marks having a strong glittering feeling like stars twinkling in the night sky and strong spatial effect as in the inks of Examples 3 and 4. The ink of Example 15 provided a glittering coated film inside and a double-colored red written mark outside as in the ink of Example 10. The inks of these Examples 11–15 were also good in writing performance.

From Table 4, the inks of Examples 16–19 containing glass flake particles in 0.01–40% by weight relative to the total amount of the inks provided good writing performances and also provided written marks having a strong glittering feeling and spatial effect. On the other hand, the ink of Comparative Example 4 containing glass flake particles in less than 0.01% by weight relative to the total amount of the ink did not provide a strong glittering feeling and the glittering feeling was poor and weak. Moreover, the ink of Comparative Example 4 also had a weak spatial effect which had been reduced. On the other hand, the ink of Comparative Example 5 containing glass flake particles in more than 40% by weight relative to the total amount of the ink had both strong glittering feeling and strong spatial effect, but had poor writing characteristic.

From Table 5, the inks of Examples 20–23 containing metal coated inorganic particles as glittering particles 0.01–40% by weight relative to the total amount of the inks provided good writing performances and also provided written marks having strong glittering feeling. On the other hand, the ink of Comparative Example 6 containing metal coated inorganic pales in less than 0.01% by weight relative to the total amount of the ink provided no strong glittering feeling and the glittering feeling was poor and weak. On the other hand, the ink of Comparative Example 7 containing metal coated inorganic particles in more than 40% by weight relative to the total amount of the ink had a strong glittering feeling, but had poor writing performance.

From Table 6, the inks of Examples 24–28 provided fluorescent written marks having a strong glittering feeling and spatial effect. The inks of Examples 29 and 30 provided fluorescent golden written marks having a strong glittering feeling. In the case of these inks, writing performance was also good.

From Table 7, also the inks of Examples 31 to 34 wherein water-soluble resins including xanthan gum, polyacrylic acid and succinoglycan are compounded provided written marks having a strong glittering feeling and spatial effect. Moreover, from Table 8, in the case of the inks of Examples 35–40 containing an aluminum powder pigment, titanium oxide and the like, the colors of the written marks were clearly shown up even on a black paper because of their sufficient opacifying power, and glittering written marks having a strong glittering feeling and spatial effect were obtained.

From Tables 9 and 10, the aqueous glittering ink of Examples 41–49 exhibited a glittering feeling suggestive of a jewel, aquamarine, and provided good fixability and good writing aptitude.

On the other hand, Comparative Example 8 provided a glittering feeling and spatial effect suggestive of a jewel, aquamarine, but no fixability was obtained at all. In Comparative Example 9, a glittering feeling and spatial effect suggestive of a jewel, aquamarine, provided and writing aptitude was good, but no fixability was obtained at all. Moreover, in Comparative Example 10, a glittering feeling and spatial effect suggestive of a jewel, aquamarine, provided and fixability was good, but writing performance was poor.

Furthermore, Table 10 shows that the inks of the Examples preferably contain the synthetic resin emulsions in 0.01–40% by weight in solids relative to the total amounts of the inks. It also shows that the inks of the Examples preferably contain the glass flake particles in 0.01–40% by weight relative to the total amounts of the inks.

Moreover, although each of the above-mentioned Examples applied the inks for those for ball-point pens, it can be used for other writing tools, printing inks, fields pertaining to coatings, to cosmetics, and the like.

Since the present invention is an aqueous glittering ink containing glass flake particles, a water-soluble resin, a water-soluble organic solvent and water, it can provide an unprecedented unique written mark or coated film having a glittering feeling and spatial effect stronger than that of aqueous ink using conventional glittering pigments. In particular, in the case of the foregoing aqueous glittering ink containing a colorant together with glass flake particles, the strong glitter depending upon the hue of the colorant can be provided to written marks or coated films.

Furthermore, the aqueous glittering ink wherein metal coated inorganic particles are compounded as glittering particles and which contains, at least, a water-soluble resin, a water-soluble organic solvent and water can provide written marks or coated films having a strong glittering feeling without loosing glittering feeling in complain to the aqueous ink using conventional glittering pigments. Moreover, in the case of the above-mentioned aqueous glittering ink containing a colorant together with metal coated inorganic particles, the strong glitter depending upon the hue of the colorant can be provided to written marks or coated films.

Moreover, the aqueous glittering ink containing glass flake particles, a water-soluble thickening resin, a water-soluble organic solvent and water as essential ingredients and containing a binder component, preferably a synthetic resin emulsion, for fixing the glass flake particles to written marks or coated films can improve fixability of the glass flake particles to the written mark or the coated film and can continue to provide a stronger glittering feeling and spatial effect to the written mark or the coated film without deteriorating ink characteristics or writing characteristics and without inhibiting effects of the compounding of the glass flake particles on the strong glittering feeling and spatial effect.

Next, as in the Examples and Comparative Examples shown in Tables 1 to 8, aqueous glittering inks of the Examples and Comparative Examples provided by mixing and stirring ingredients including water, a water-soluble organic solvent, glittering particles and a colorant or a pigment base and the like in the compositions and amounts (parts by weight) given in Tables 11 to 13 to disperse them, thereafter charging a water-soluble resin and filtering the resulting mixture, and subsequently degassing. In every preparation, heretofore known dispersing, degassing, filtering techniques and the like were used.

Likewise, as in the Examples and Comparative Examples shown is Tables 9 and 10, aqueous glittering its of other Examples and Comparative Examples were prepared by mixing and stirring ingredients including water, a water-soluble organic solvent, and, as required, other additives in the compositions and amounts (parts by weight) given in Tables 14 to 16 to stir them, charge glittering particles and stir, thereafter charging a water-soluble thickening resin and stirring the resulting mixture. Next, after adjusting the pH, as required, the colorants as required was added and stirred. Subsequently, synthetic resin emulsion was added and mixed. For information, in this preparation, heretofore known dispersing, degassing, filtering techniques and the like were used. By the pH adjustment in the said method of preparation, the pH was adjusted to 8.5 by caustic soda.

TABLE 11

(Parts by weight)

| Tradename | | $D_M$ | Example 50 | 51 | 52 | 53 | 54 | 55 | 56 | 57 | 58 | 59 |
|---|---|---|---|---|---|---|---|---|---|---|---|---|
| Glittering Particles | | | | | | | | | | | | |
| Glass flake | | | | | | | | | | | | |
| REFSX | 2015PS | 15 | 5 | | | | | | | | | |
| REFSX | 2025PS | 25 | | 5 | | | | | | | | |
| REFSX | 2040PS | 40 | | | 5 | | | | | 5 | 5 | |
| Aluminum Powder | | | | | | | | | | | | |
| WXM | 0630 | 5 | | | | | | | | | | |
| WXM | U75C | 13 | | | | 5 | | | | | | |
| WXM | 5422 | 18 | | | | | 5 | | | | | |
| WXM | 1440 | 30 | | | | | | 5 | | | | 5 |
| WXM | 1415 | 50 | | | | | | | 5 | | | |
| Fixing Agent | | | | | | | | | | | | |
| Nikasol FH-011A | | | | | | | | | | | | |
| Mowinyl DM772 | | | | | | | | | | | | |
| Colorant | | | | | | | | | | | | |
| Pigment base | | | 1 | 1 | 1 | 1 | 1 | 1 | 1 | 5 | 10 | 6 |
| Organic Solvent | | | | | | | | | | | | |
| Glycerine | | | 7 | 7 | 7 | 7 | 7 | 7 | 7 | 7 | 7 | 7 |
| Propylene Glycol | | | 15 | 15 | 15 | 15 | 15 | 15 | 15 | 15 | 15 | 15 |
| Surfactant | | | | | | | | | | | | |
| Phosphanol PE-510 | | | 1 | 1 | 1 | 1 | 1 | 1 | 1 | 1 | 1 | 1 |
| Thickening Resin | | | | | | | | | | | | |
| Kalzan | | | 0.3 | 0.3 | 0.3 | | | | | 0.3 | 0.3 | |
| Carbopol | | | 0.2 | 0.2 | 0.2 | | | | | 0.2 | 0.2 | |
| Raozan | | | | | | 0.3 | 0.3 | 0.3 | 0.3 | | | 0.3 |
| Water | | | 70.5 | 70.5 | 70.5 | 70.7 | 70.7 | 70.7 | 70.7 | 68.5 | 61.5 | 68.7 |
| Median diameter (μm) | | | 15 | 25 | 40 | 18 | 18 | 30 | 60 | 40 | 40 | 30 |
| Smoothness (μm) | | | 0.05 | 0.05 | 0.05 | 0.14 | 0.04 | 0.04 | 0.04 | 0.05 | 0.05 | 0.04 |
| Smoothness/Median diameter | | | 0.006 | 0.002 | 0.0013 | 0.011 | 0.0023 | 0.0013 | 0.0006 | 0.0013 | 0.0013 | 0.0013 |
| Covering ratio of the colorants (%) | | | 14 | 14 | 14 | 5 | 3 | 1 | 5 | 40 | 30 | 65 |
| Interspersing rate of the glittering particles (%) | | | 30 | 30 | 30 | 45 | 40 | 35 | 25 | 30 | 30 | 33 |
| Concavo-convex degree of the resin coating (μm) | | | — | — | — | — | — | — | — | — | — | — |
| Smoothness on the coated films (μm) | | | 9.2 | 9.2 | 9.2 | 9.2 | 9.2 | 9.2 | 9.2 | 9.2 | 9.2 | 9.2 |
| Viscosity (mPa · s) | | | | | | | | | | | | |
| $V_{ds}$ (rotation speed 0.5 rpm) | | | 6000 | 6500 | 7200 | 6000 | 6400 | 6600 | 6500 | 7000 | 6600 | 5400 |
| T.I. Value ($V_{50}/V_{10}$) | | | 1.7 | 1.7 | 1.7 | 1.9 | 1.9 | 1.8 | 1.8 | 1.7 | 1.7 | 1.9 |
| Color development | | | ◎ | ◎ | ◎ | ◎ | ◎ | ◎ | ◎ | ◎ | ◎ | ◎ |
| Glittering feeling | | | ○ | ◎ | ◎ | ○ | ○ | ◎ | ◎ | ◎ | ○ | ○ |
| Writing performance | | | | | | | | | | | | |
| Initial writing performance (writing performance right after constructing the pen) | | | ○ | ○ | ○ | ○ | ○ | ○ | ○ | ○ | ○ | ○ |

TABLE 11-continued (Parts by weight)

| Tradename | $D_M$ | Example 50 | 51 | 52 | 53 | 54 | 55 | 56 | 57 | 58 | 59 |
|---|---|---|---|---|---|---|---|---|---|---|---|
| Writing performance three days after directing the pen tip downward | | ○ | ○ | ○ | ○ | ○ | ○ | ○ | ○ | ○ | ○ |

TABLE 12

(parts by weight)

| Tradename | $D_M$ | Example 60 | 61 | 62 | 63 | 64 | 65 | 66 | 67 | 68 | 69 | 70 | 71 |
|---|---|---|---|---|---|---|---|---|---|---|---|---|---|
| Glittering particles | | | | | | | | | | | | | |
| Glass Flake | | | | | | | | | | | | | |
| REFSX 2015PS | 15 | | | | | | | | | | | | |
| REFSX 2025PS | 25 | | | | | | | | | | | | |
| REFSX 2040PS | 40 | | 1 | 3 | 15 | 23 | | | | | 5 | 5 | 5 |
| Aluminum Powder | | | | | | | | | | | | | |
| WXM 0630 | 5 | | | | | | | | | | | | |
| WXM U75C | 13 | | | | | | | | | | | | |
| WXM 5422 | 18 | | | | | | | | | | | | |
| WXM 1440 | 30 | 5 | | | | | 1 | 3 | 10 | 20 | | | |
| WXM 1415 | 50 | | | | | | | | | | | | |
| Fixing Agent | | | | | | | | | | | | | |
| Nikasol FH-011A | | | | | | | | | | | | | |
| Mowinyl DM772 | | | | | | | | | | | | | |
| Colorant | | | | | | | | | | | | | |
| Pigment base | | 8 | 1 | 1 | 1 | 1 | 1 | 1 | 1 | 1 | 1 | 1 | 1 |
| Organic Solvent | | | | | | | | | | | | | |
| Glycerine | | 7 | 7 | 7 | 7 | 7 | 7 | 7 | 7 | 7 | 7 | 7 | 7 |
| Propylene glycol | | 15 | 15 | 15 | 15 | 15 | 15 | 15 | 15 | 15 | 15 | 15 | 15 |
| Surfactant | | | | | | | | | | | | | |
| Phosphanol PE-510 | | 1 | 1 | 1 | 1 | 1 | 1 | 1 | 1 | 1 | 1 | 1 | 1 |
| Thickening resin | | | | | | | | | | | | | |
| Kalzan | | | 0.3 | 0.3 | 0.3 | 0.3 | | | | | 0.18 | 0.14 | 0.6 |
| Carbopol | | | 0.2 | 0.2 | 0.2 | 0.2 | | | | | 0.09 | 0.08 | 0.3 |
| Raozan | | 0.3 | | | | | 0.3 | 0.3 | 0.3 | 0.3 | | | |
| Water | | 63.7 | 74.5 | 72.5 | 60.5 | 47.5 | 74.7 | 73.7 | 66.7 | 55.7 | 70.73 | 70.8 | 70.1 |
| Median diameter (μm) | | 30 | 40 | 40 | 40 | 40 | 30 | 30 | 30 | 30 | 40 | 40 | 40 |
| Smoothness (μm) | | 0.04 | 0.05 | 0.05 | 0.05 | 0.05 | 0.04 | 0.04 | 0.04 | 0.04 | 0.05 | 0.05 | 0.05 |
| Smoothness/Median diameter | | 0.0013 | 0.0013 | 0.0013 | 0.0013 | 0.0013 | 0.0013 | 0.0013 | 0.0013 | 0.0013 | 0.0013 | 0.0013 | 0.0013 |
| Coating ratio of the colorants (%) | | 80 | 25 | 14 | 14 | 14 | 10 | 1 | 1 | 1 | 14 | 14 | 14 |
| Interspersing rate of the glittering particles (%) | | 33 | 12 | 34 | 50 | 30 | 13 | 26 | 60 | 75 | 30 | 30 | 30 |
| Concavo-convex rate of coating resin (μm) | | — | — | — | — | — | — | — | — | — | — | — | — |
| Smoothness on the coated films (μm) | | 9.2 | 9.2 | 9.2 | 9.2 | 9.2 | 9.2 | 9.2 | 9.2 | 9.2 | 9.2 | 9.2 | 9.2 |
| Viscosity (mPa · s) | | | | | | | | | | | | | |
| $V_{ds}$ (rotation speed 0.5 rpm) | | 6500 | 6200 | 7000 | 7500 | 8200 | 5800 | 6300 | 7000 | 8000 | 2100 | 1000 | 14000 |
| T.I. Value ($V_{50}/V_{10}$) | | 1.8 | 1.7 | 1.7 | 1.7 | 1.7 | 1.8 | 1.8 | 1.8 | 1.8 | 1.6 | 1.6 | 1.7 |
| Color development | | ⊚ | ⊚ | ⊚ | ○ | ○' | ⊚ | ⊚ | ○ | ○' | ⊚ | ⊚ | ⊚ |
| Glittering feeling | | ○ | ○ | ⊚ | ⊚ | ⊚ | ○ | ⊚ | ⊚ | ⊚ | ⊚ | ⊚ | ⊚ |
| Writing performance | | | | | | | | | | | | | |
| Initial writing performance (writing performance right after constructing the pen) | | ○ | ○ | ○ | ○ | ○ | ○ | ○ | ○ | ○ | ○ | ○ | ○ |

TABLE 12-continued (parts by weight)

| Tradename | $D_M$ | Example 60 | 61 | 62 | 63 | 64 | 65 | 66 | 67 | 68 | 69 | 70 | 71 |
|---|---|---|---|---|---|---|---|---|---|---|---|---|---|
| Writing performance three days after directing the pen tip downward | | ○ | ○ | ○ | ○ | ○ | ○ | ○ | ○ | ○ | ○ | ○ | ○ |

TABLE 13

(parts by weight)

| Tradename | | $D_M$ | Comparative Example 15 | 16 | 17 | 18 | 19 | 20 | 21 | 22 | 23 | 24 | 25 |
|---|---|---|---|---|---|---|---|---|---|---|---|---|---|
| Glittering particles | | | | | | | | | | | | | |
| Glass Flake | | | | | | | | | | | | | |
| REFSX | 2015PS | 15 | | | | | | | | | | | |
| REFSX | 2025PS | 25 | | | | | | | | | | | | |
| REFSX | 2040PS | 40 | | 5 | 5 | | 30 | 40 | | | 5 | 5 | 5 |
| Aluminum powder | | | | | | | | | | | | | |
| WXM | 0630 | 5 | 5 | | | | | | | | | | |
| WXM | U75C | 13 | | | | | | | | | | | |
| WXM | 5422 | 18 | | | | | | | | | | | |
| WXM | 1440 | 30 | | | | 5 | | | 30 | 40 | | | |
| WXM | 1415 | 50 | | | | | | | | | | | |
| Fixing Agent | | | | | | | | | | | | | |
| Nikasol FH-011A | | | | | | | | | | | | | |
| Mowinyl DM772 | | | | | | | | | | | | | |
| Colorant | | | | | | | | | | | | | |
| Pigment base | | | 1 | 13 | 15 | 10 | 1 | 1 | 1 | 1 | 1 | 1 | 1 |
| Organic solvent | | | | | | | | | | | | | |
| Glycerine | | | 7 | 7 | 7 | 7 | 7 | 7 | 7 | 7 | 7 | 7 | 7 |
| Propylene Glycol | | | 15 | 15 | 15 | 15 | 15 | 15 | 15 | 15 | 15 | 15 | 15 |
| Surfactant | | | | | | | | | | | | | |
| Phosphanol PE-510 | | | 1 | 1 | 1 | 1 | 1 | 1 | 1 | 1 | 1 | 1 | 1 |
| Thickening resin | | | | | | | | | | | | | |
| Kalzan | | | | 0.3 | 0.3 | | 0.3 | 0.3 | 0.3 | 0.3 | 0.3 | 0.09 | 0.7 |
| Carbopol | | | | 0.2 | 0.2 | | 0.2 | 0.2 | 0.2 | 0.2 | 0.2 | 0.04 | 0.4 |
| Raozan | | | 0.3 | | | 0.3 | | | | | | | |
| Water | | | 70.7 | 58.5 | 66.5 | 61.7 | 45.5 | 35.5 | 45.5 | 35.5 | 70.5 | 70.9 | 69.9 |
| Median diameter (μm) | | | 8 | 40 | 40 | 30 | 40 | 40 | 30 | 30 | 40 | 40 | 40 |
| Smoothness (μm) | | | 0.14 | 0.06 | 0.05 | 0.04 | 0.05 | 0.06 | 0.04 | 0.04 | 0.05 | 0.06 | 0.06 |
| Smoothness/Median diameter | | | 0.023 | 0.0013 | 0.0013 | 0.0013 | 0.0013 | 0.0013 | 0.0013 | 0.0013 | 0.0013 | 0.0013 | 0.0013 |
| Coating ratio of the colorants (%) | | | 10 | 92 | 100 | 100 | 14 | 14 | 1 | 1 | 14 | 14 | 14 |
| Interspersing rate of the glittering particles (%) | | | 100 | 30 | 30 | 33 | 53 | 100 | 95 | 100 | 30 | 30 | 30 |
| Concavo-convex rate of the coating resin (μm) | | | — | — | — | — | — | — | — | — | — | — | — |
| Smoothness on the coated films (μm) | | | 9.2 | 9.2 | 9.2 | 9.2 | 9.2 | 9.2 | 9.2 | 9.2 | 5.9 | 9.2 | 9.2 |
| Viscosity (mPa·s) | | | | | | | | | | | | | |
| $V_{ds}$ (rotation speed 0.5 rpm) | | | 6500 | 7000 | 7000 | 8600 | 8200 | 40000 | 8000 | 40000 | 7200 | 880 | 25000 |
| T.I. Value ($V_{50}/V_{10}$) | | | 1.8 | 1.7 | 1.7 | 1.8 | 1.7 | 1.8 | 1.8 | 1.8 | 1.7 | 1.8 | 1.8 |
| Color development | | | ◎ | ◎ | ◎ | ◎ | Δ | x | Δ | x | ◎ | ◎ | ◎ |
| Glittering feeling | | | x | Δ | x | x | ◎ | ◎ | ◎ | ◎ | x | ◎ | ◎ |
| Writing performance | | | | | | | | | | | | | |
| Initial writing performance (writing performance right after constructing the pen) | | | ○ | ○ | ○ | ○ | ○ | x | ○ | x | ○ | ○ | x |
| Writing performance three days after directing the pen tip downward | | | ○ | ○ | ○ | ○ | ○ | — | ○ | — | ○ | x (thin spot) | — |

TABLE 14

(parts by weight)

| Tradename | $D_M$ | Example 72 | 73 | 74 | 75 | 76 | 77 | 78 | 79 | 80 | 81 | 82 |
|---|---|---|---|---|---|---|---|---|---|---|---|---|
| Glittering particles | | | | | | | | | | | | |
| *Glass Flake* | | | | | | | | | | | | |
| REFSX 2015PS | 15 | 5 | | | | | | | | | | |
| REFSX 2025PS | 25 | | 5 | | | | | | | | | |
| REFSX 2040PS | 40 | | | 5 | | | | | 5 | | 1 | 3 |
| *Aluminum Powder* | | | | | | | | | | | | |
| WXM 0630 | 5 | | | | | | | | | | | |
| WXM U75C | 13 | | | | 5 | | | | | | | |
| WXM 5422 | 18 | | | | | 5 | | | | | | |
| WXM 1440 | 30 | | | | | | 5 | | | 5 | | |
| WXM 1415 | 50 | | | | | | | 5 | | | | |
| Fixing Agent | | | | | | | | | | | | |
| Nikasol FH-011A | | | | | | | | | | | | |
| Mowinyl DM772 | | 10 | 10 | 10 | 10 | 10 | 10 | 10 | 10 | 10 | 10 | 10 |
| Colorant | | | | | | | | | | | | |
| Pigment base | | 1 | 1 | 1 | 1 | 1 | 1 | 1 | 5 | 5 | 1 | 1 |
| Organic Solvent | | | | | | | | | | | | |
| Glycerine | | 7 | 7 | 7 | 7 | 7 | 7 | 7 | 7 | 7 | 7 | 7 |
| Propylene Glycol | | 15 | 15 | 15 | 15 | 15 | 15 | 15 | 15 | 15 | 15 | 15 |
| Surfactant | | | | | | | | | | | | |
| Phosphanol PE-510 | | 1 | 1 | 1 | 1 | 1 | 1 | 1 | 1 | 1 | 1 | 1 |
| Thickening resin | | | | | | | | | | | | |
| Kalzan | | 0.3 | 0.3 | 0.3 | | | | | 0.3 | | 0.3 | 0.3 |
| Carbopol | | 0.2 | 0.2 | 0.2 | | | | | 0.2 | | 0.2 | 0.2 |
| Raozan | | | | | 0.3 | 0.3 | 0.3 | 0.3 | | 0.3 | | |
| Water | | 60.5 | 60.5 | 60.5 | 60.7 | 60.7 | 60.7 | 60.7 | 58.5 | 58.7 | 64.5 | 92.5 |
| Median diameter (μm) | | 15 | 25 | 40 | 18 | 18 | 30 | 50 | 40 | 30 | 40 | 40 |
| Smoothness (μm) | | 0.05 | 0.05 | 0.05 | 0.14 | 0.04 | 0.04 | 0.04 | 0.05 | 0.04 | 0.05 | 0.05 |
| Smoothness/Median diameter | | 0.0035 | 0.002 | 0.0013 | 0.0108 | 0.0022 | 0.0013 | 0.0008 | 0.0013 | 0.0013 | 0.0013 | 0.0013 |
| Coating (%) | | 14 | 14 | 14 | 5 | 3 | 1 | 5 | 30 | 75 | 25 | 14 |
| Interspersing rate of the glittering particles (%) | | 30 | 30 | 30 | 45 | 40 | 33 | 25 | 30 | 33 | 12 | 24 |
| Concavo-convex rate of the coating resin (μm) | | 0.25 | 0.25 | 0.25 | 0.25 | 0.25 | 0.25 | 0.25 | 0.25 | 0.25 | 0.25 | 0.25 |
| Smoothness on the coated films (μm) | | 9.2 | 9.2 | 9.2 | 9.2 | 9.2 | 9.2 | 9.2 | 9.2 | 9.2 | 9.2 | 9.2 |
| Viscosity (mPa · s) | | | | | | | | | | | | |
| $V_{ds}$ (rotation speed 0.5 rpm) | | 6000 | 6500 | 7200 | 6000 | 5400 | 6600 | 6600 | 7000 | 5500 | 6200 | 7000 |
| T.I. Value ($V_{50}/V_{10}$) | | 1.7 | 1.7 | 1.7 | 1.9 | 1.9 | 1.8 | 1.8 | 1.7 | 1.8 | 1.7 | 1.7 |
| Color development | | ⊙ | ⊙ | ⊙ | ⊙ | ⊙ | ⊙ | ⊙ | ⊙ | ⊙ | ⊙ | ⊙ |
| Glittering feeling | | o' | o | o | o' | o' | o | o | o' | o' | o' | o |
| Fixability | | o | o | o | o | o | o | o | o | o | o | o |
| Writing performance | | | | | | | | | | | | |
| Initial writing performance (writing performance right after constructing the pen) | | o | o | o | o | o | o | o | o | o | o | o |
| Writing performance three days after directing the pen tip downward | | o | o | o | o | o | o | o | o | o | o | o |

TABLE 15

(parts by weight)

| | | | | | | | | Example | | | | | |
|---|---|---|---|---|---|---|---|---|---|---|---|---|---|
| Tradename | | $D_M$ | 83 | 84 | 85 | 86 | 87 | 88 | 89 | 90 | 91 | 92 | 93 | 94 |
| Glittering particles | | | | | | | | | | | | | | |
| Glass Flake | | | | | | | | | | | | | | |
| REFSX | 2015PS | 15 | | | | | | | | | | | | |
| REFSX | 2025PS | 25 | | | | | | | | | | | | |
| REFSX | 2040PS | 40 | 15 | 25 | | | | | | | | | | |
| Aluminum powder | | | | | | | | | | | | | | |
| WXM | 0630 | 5 | | | | | | | | | | | | |
| WXM | U75C | 13 | | | | | | | | | | | | |
| WXM | 5422 | 18 | | | | | | | | | | | | |
| WXM | 1440 | 30 | | | 1 | 3 | 10 | 20 | | | | | | 5 |
| WXM | 1415 | 50 | | | | | | | | | | | | |
| Fixing Agent | | | | | | | | | | | | | | |
| Nikasol FH-011A | | | | | | | | | 20 | 20 | 20 | 20 | 20 | 20 |
| Mowinyl DM772 | | | 10 | 10 | 10 | 10 | 10 | 10 | | | | | | |
| Colorant | | | | | | | | | | | | | | |
| Pigment base | | | 1 | 1 | 1 | 1 | 1 | 1 | 1 | 1 | 5 | 5 | 10 | 5 |
| Organic solvent | | | | | | | | | | | | | | |
| Glycerine | | | 7 | 7 | 7 | 7 | 7 | 7 | 7 | 7 | 7 | 7 | 7 | 7 |
| Propylene glycol | | | 15 | 15 | 15 | 15 | 15 | 15 | 15 | 15 | 15 | 15 | 15 | 15 |
| Surfactant | | | | | | | | | | | | | | |
| Phosphanol PE-510 | | | 1 | 1 | 1 | 1 | 1 | 1 | 1 | 1 | 1 | 1 | 1 | 1 |
| Thickening resin | | | | | | | | | | | | | | |
| Kalzan | | | 0.3 | 0.3 | | | | | 0.3 | | 0.3 | | 0.3 | |
| Carbopol | | | 0.2 | 0.2 | | | | | 0.2 | | 0.2 | | 0.2 | |
| Raozan | | | | | 0.3 | 0.3 | 0.3 | 0.3 | | 0.3 | | 0.3 | | 0.3 |
| Water | | | 30.5 | 37.5 | 54.7 | 62.7 | 55.7 | 45.7 | 50.5 | 50.7 | 46.5 | 46.7 | 41.5 | 43.7 |
| Median diameter ($\mu$m) | | | 40 | 40 | 30 | 30 | 30 | 30 | 40 | 50 | 40 | 50 | 40 | 50 |
| Smoothness ($\mu$m) | | | 0.05 | 0.05 | 0.04 | 0.04 | 0.04 | 0.04 | 0.05 | 0.04 | 0.05 | 0.04 | 0.05 | 0.04 |
| Smoothness/Median diameter | | | 0.0013 | 0.0013 | 0.0013 | 0.0013 | 0.0013 | 0.0013 | 0.0013 | 0.0006 | 0.0013 | 0.0006 | 0.0013 | 0.0006 |
| Coating ratio of the colorants (%) | | | 14 | 14 | 10 | 1 | 1 | 1 | 14 | 1 | 40 | 70 | 80 | 80 |
| Interspersing rate of the glittering particles (%) | | | 50 | 60 | 13 | 26 | 60 | 73 | 30 | 33 | 30 | 38 | 30 | 33 |
| Concavo-convex rate of the coating resin ($\mu$m) | | | 0.25 | 0.25 | 0.25 | 0.25 | 0.25 | 0.25 | 0.15 | 0.13 | 0.15 | 0.13 | 0.15 | 0.13 |
| Smoothness on the coated film ($\mu$m) | | | 9.2 | 9.2 | 9.2 | 9.2 | 9.2 | 9.2 | 9.2 | 9.2 | 9.2 | 9.2 | 9.2 | 9.2 |
| Viscosity (mPa · s) | | | | | | | | | | | | | | |
| $V_{ds}$ (rotation speed 0.5 rpm) | | | 7500 | 8200 | 5600 | 6300 | 7000 | 7600 | 7200 | 6600 | 7200 | 6600 | 7200 | 6600 |
| T.I. Value ($V_{50}/V_{10}$) | | | 1.7 | 1.7 | 1.7 | 1.7 | 1.3 | 1.8 | 1.3 | 1.7 | 1.7 | 1.3 | 1.7 | 1.3 |
| Color development | | | ○ | ○' | ⊚ | ⊚ | ○ | ○' | ⊚ | ⊚ | ⊚ | ⊚ | ⊚ | ⊚ |
| Glittering feeling | | | ○ | ○ | ○' | ○ | ○ | ○ | ⊚ | ⊚ | ⊚ | ○ | ○ | ○ |
| Fixability | | | ○ | ○ | ○ | ○ | ○ | ○ | ○ | ○ | ○ | ○ | ○ | ○ |
| Writing performance | | | | | | | | | | | | | | |
| Initial writing performance (writing performance right after constructing the pen) | | | ○ | ○ | ○ | ○ | ○ | ○ | ○ | ○ | ○ | ○ | ○ | ○ |
| Writing performance three days after directing the pen tip downward | | | ○ | ○ | ○ | ○ | ○ | ○ | ○ | ○ | ○ | ○ | ○ | ○ |

TABLE 16

(Parts by weight)

| Tradename | | $D_M$ | Comparative Example 26 | 27 | 28 | 29 | 30 | 31 | 32 | 33 | 34 |
|---|---|---|---|---|---|---|---|---|---|---|---|
| Glittering particles | | | | | | | | | | | |
| Glass Flake | | | | | | | | | | | |
| REFSX | 2015PS | 15 | | | | | | | | | |
| REFSX | 2025PS | 25 | | | | | | | | | |
| REFSX | 2040PS | 40 | | 5 | 5 | | 30 | 40 | | | 5 |
| Aluminum Powder | | | | | | | | | | | |
| WXM | 0630 | 5 | 5 | | | | | | | | |
| WXM | U75O | 13 | | | | | | | | | |
| WXM | 5422 | 18 | | | | | | | | | |
| WXM | 1440 | 30 | | | | 5 | | | 30 | 40 | |
| WXM | 1415 | 50 | | | | | | | | | |
| Fixing Agent | | | | | | | | | | | |
| Nikasol FH-011A | | | | | | | | | | | |
| Mowinyl DM772 | | | | 10 | 10 | 10 | 10 | 10 | 10 | 10 | 10 |
| Colorant | | | | | | | | | | | |
| Pigment base | | | 1 | 10 | 16 | 10 | 1 | 1 | 1 | 1 | 1 |
| Organic Solvent | | | | | | | | | | | |
| Glycerine | | | 7 | 7 | 7 | 7 | 7 | 7 | 7 | 7 | 7 |
| Propylene glycol | | | 15 | 15 | 15 | 15 | 15 | 15 | 15 | 15 | 15 |
| Surfactant | | | | | | | | | | | |
| Phosphanol PE-510 | | | 1 | 1 | 1 | 1 | 1 | 1 | 1 | 1 | 1 |
| Thickening resin | | | | | | | | | | | |
| Kalzan | | | | 0.3 | 0.3 | | 0.3 | 0.3 | 0.3 | 0.3 | 0.3 |
| Carbopol | | | | 0.2 | 0.2 | | 0.2 | 0.2 | 0.2 | 0.2 | 0.2 |
| Raozan | | | 0.3 | | | 0.3 | | | | | |
| Water | | | 60.7 | 51.6 | 46.5 | 51.7 | 35.5 | 26.5 | 35.5 | 35.5 | 60.6 |
| Median diameter (Dia) (μm) | | | 5 | 40 | 40 | 30 | 40 | 40 | 30 | 30 | 40 |
| Smoothness (μm) | | | 0.14 | 0.05 | 0.05 | 0.04 | 0.05 | 0.05 | 0.04 | 0.04 | 0.05 |
| Smoothness/Median diameter | | | 0.028 | 0.0013 | 0.0013 | 0.0013 | 0.0013 | 0.0013 | 0.0013 | 0.0013 | 0.0013 |
| Coating ratio of the colorants (%) | | | 10 | 93 | 100 | 100 | 14 | 14 | 1 | 1 | 14 |
| Interspersing rate of the glittering particles (%) | | | 100 | 30 | 30 | 33 | 86 | 100 | 95 | 100 | 30 |
| Concavo-convex rate of the (μm) | | | 0.35 | 0.25 | 0.25 | 0.25 | 0.25 | 0.25 | 0.25 | 0.25 | 0.25 |
| Smoothness on the coated film (μm) | | | 9.2 | 9.2 | 9.2 | 9.2 | 9.2 | 9.2 | 9.2 | 9.2 | 6.9 |
| Viscosity (mPa · s) | | | | | | | | | | | |
| $V_{ds}$ (rotation speed 0.5 rpm) | | | 6500 | 7000 | 7000 | 5600 | 8200 | 40000 | 8000 | 40000 | 7200 |
| T.I. Value ($V_{50}/V_{10}$) | | | 1.8 | 1.8 | 1.7 | 1.8 | 1.7 | 1.8 | 1.8 | 1.8 | 1.7 |
| Color development | | | ◎ | ◎ | ◎ | ◎ | Δ | x | Δ | x | ◎ |
| Glittering feeling | | | x | Δ | x | x | ◎ | ◎ | ◎ | ◎ | x |
| Fixability | | | ○ | ○ | ○ | ○ | ○ | ○ | ○ | ○ | ○ |
| Writing performance | | | | | | | | | | | |
| Initial writing performance (writing performance right after constructing the pen) | | | ○ | ○ | ○ | ○ | ○ | x | ○ | x | ○ |
| Writing performance three days after directing the pen tip downward | | | ○ | ○ | ○ | ○ | ○ | — | ○ | — | ○ |

In Tables 11–16, each raw material composition is as follows:
(Glittering Particles)
① Glass Flake Particles: trade name "Metashine REFSX-2015PS", manufactured by Toyo Aluminium Co., Ltd., median diameter=about 15 μm
② Glass Flake Particles: trade name "Metashine REFSX-2025PS", manufactured by Toyo Aluminium Co., Ltd, median diameter=about 25 μm
③ Glass Flake Particles: trade name "Metashine REFSX-2040PS", manufactured by Toyo Aluminium Co., Ltd., median diameter =about 40 μm
④ Aluminum powder: trade name "WXM0630", manufactured by Toyo Aluminium Co., Ltd, median diameter =about 5 μm
⑤ Aluminum powder: trade name "WXM U75C", manufactured by Toyo Aluminium Co., Ltd, average particle size=about 13 μm
⑥ Aluminum powder: trade name "WXM 5422", manufactured by Toyo Aluminium Co., Ltd., average particle size=about 18 μm
⑦ Aluminum powder: trade name "WXM 1440", manufactured by Toyo Aluminium Co., Ltd., average particle size=about 30 μm ⑧ Aluminum powder: trade name "WXM 1415", manufactured by Toyo Aluminium Co., Ltd., average particle size=about 50 μm
(Water-soluble Resin)
① Xanthan gum: trade name "Kelzan", manufactured by Kelco a unit of Monsanto Company.
④ Polyacrylic acid: trade name "Carbopol 940", manufactured by BF Goodrich Co., Ltd.
⑤ Succinoglycan: trade name "Reozan", manufactured by Sansho Co., Ltd
(Water-soluble Organic Solvent)
① Glycerin
② Propylene glycol
(Binder Component/Fixing Agent)
① Acryl acrilate, Acryl methylacrilate ether copolymer resin emulsion: trade name "Nikasol FH-011A", manufactured by Nihon Carbide Kogyo Co., Ltd.; anionic property; pH 7.0; minimum film forming temperature 0° C.; viscosity 150 mPa·s (a BH-typed viscometer at the temperature of 25° C.); median diameter=about 0.05 μm
② Acrylate ester copolymer resin emulsion: trade name "Mowinyl DM772" manufactured by Clariant Polymer Co., Ltd.; anionic property, pH 8.5; minimum film forming temperature 12~14° C.; viscosity 1200 mPa·s (a BH-typed viscometer at the temperature of 25° C.); median diameter=about 0.06 μm Here, in the Tables, binder component/fixing agent is represented by the amount in which solids are contained.
(Colorant)
(Pigment Base)

Pigment dispersion was prepared (average particle size= 0.08 μm; solid content=10% by weight), by adding and dissolving sodium hydroxide to a mixture obtained by mixing phthalocyanine blue (5 parts by weight) and a styrene-acryl copolymer (1 part by weight: trade name "JOHNCRYL J683", Johnson Polymer Co., Ltd., weight average molecular weight=8000) thereafter conducting dispersion with a ball mill.
(Lubricant/Surfactant)

mono (di) polyoxyethylene alkyl ether phospholate: manufactured by Toho Kagaku Kogyo Co., Ltd. under the trade name of "Phosphanol PE-510"
(Preparation of Test Samples)

Next, a ball point pen was prepared or each sample test wherein each of the ink of Examples and Comparative Examples given in Table 11–16 was packed into an ink container made of a hollow polypropylene tube equipped with a ball-point pen tip made of stainless steel (ball material silicon carbide), and ball-point pens of test samples having the ink containers therein were prepared. The diameter of a ball is 1.0 mm.
(Evaluation Test)

The glittering feeling and color development of each ink for the Examples and Comparative Examples given in Tables 11 to 16 were evaluated in a state of dried written marks by writing on commercially available loose-leaf sheets with these ball-point pens. The fixability of the written marks or coated films of the ink was also evaluated in Tables 14 to 16. In addition, the viscosity and thixotropy index (T.I. value) in each of the Examples and Comparative Examples were measured.

Here, in Tables 11 to 16, each property value is evaluated in a state of dried written marks. The said "median diameters" refers to D50 value (μm) measured by the method of laser diffraction analysis using an equipment manufactured by ELIONIX INC. under the trade name of "ERA-8000". In addition, the said smoothness is the average value of R max (μm), the maximum value of roughness measured on each surface of the several glittering particles which exist per unit area of the written marks or coated films in a state of dryness by using the microscope manufactured by ELIONIX INC. under the trade name of "ERA-8000". Here, the "surface coating ratio of the colorant" refers to the coating ratio of the colorant including the coloring pigment which covers the surface of a particle and is represented by the coating area of the colorant to the total surface area of the surface of a particle. In the present invention, the coating ratio of the colorant is so obtained as using the electron microscope manufactured by ELIONIX INC. under the trade name of "ERA-8000" as already mentioned, and measuring the average value of the surface area of the said particles and the coating area of the colorant. "Interspersing rate" of the glittering particles refers to the value (%) obtained by measuring the area of the glittering particles occupying the total written surface by using the microscope manufactured by ELIONIX INC. under the trade name of "ERA-8000" as already mentioned, thereby calculating the ratio. The concave-convex rate of the resin coated films refers to the average value of $R_{max}$ (μm), the maximum value of roughness measured on each surface of the several glittering particles which exist per unit area of the written marks or coated films in a state of dryness by using the microscope manufactured by ELIONIX INC. under the trade name of "ERA8000". Here, the "smoothness on the coated films" refers to the average value of R max (μm), the maximum value of roughness measured on each surface of the several glittering particles which exist per unit area of the written marks or coated films in a state of dryness by using the microscope manufactured by ELIONIX INC. under the trade name of "ERA-8000".

Here, the Comparative Example 32 in the Table 16, the evaluation is conducted by writing on a commercially available art paper unlike the case of the said Examples and Comparative Examples using a commercially available loose-leaf sheet.

As for the ink viscosity, with the use of an ELD-typed viscometer obtained by Toki Sangyo Co., Ltd. the thixotropy index (T.I. value) is measured represented by the ratio of V0.5 to V1.0 (V0.5/V1.0), wherein V0.5 is the viscosity with the rotation speed of 0.5 rpm and V1.0 is the viscosity with the rotation speed of 1.0 rpm when the ink is measured by the said ELD-typed viscometer (3° R14 cone, at the temperature of 20° C.). The above tables also show the V0.5, the viscosity when measured by an ELD-typed viscometer with a rotation speed of 0.5 rpm(3° R14 cone at the temperature of 20° C.).
(Evaluation of Color Development)

Evaluation of the color development was conducted by visual observation of writings. Rating criteria were, in a state of dried written marks,: ⊚ for ones having particularly strong color development, ○ for ones having strong color development, ○' for ones having color development, Δ for ones having little color development, x for ones having no color development.
(Evaluation of Glittering Feeling)

Evaluation of the glittering feeling was conducted by visual observation of writings. Rating criteria were, in a state of dried written marks,: ⊚ for ones having particularly strong glittering feeling. ○ for ones having strong glittering feeling, ○' for ones having glittering feeling, Δ for ones having little color development, x for ones having no color development.
(Evaluation of Fixability)

The fixability was evaluated according to the following criteria by writing on commercially available loose-leaf sheets with ball-point pens of test samples according to every Example and Comparative Example, drying the written marks, thereafter adhering commercially available adhesive cellophane tapes thereon, and then visually observing conditions after peeling the tapes.

○: Glittering particles remain on the written marks and the glittering feeling before peeling of the cellophane tape has not been lost.

x: Glittering parties are peeled from the written marks and the glittering feeling before peeling of the cellophane tape has been lost.

Tables 11 to 16 show the result of the glittering feeling and color development of the written marks or coated films of the ink according to every Example and Comparative Example. In addition, tables 14 to 16 show the result of the fixability of the said written marks or coated film.

(Evaluation of Writing Performance)

Writing performance refers to the one right after the construction of a ball-point pen in the said each test sample and the one three days after directing the pen-tip of the said ball-point pen downward. This writing performance was, as above-mentioned, evaluated based on the following criteria, that is; ○ for ones having good writing performance with smooth feeling when writing and x for ones having poor writing performance with little smoothness. Further, in the Tables, those with thin spots are shown as x (thin spots).

As shown in the Examples 50 to 56. Comparative Example 15, Example 72 to 78 and Comparative Example 26 in the Tables 11 to 16, it is recognized for the glittering particles to have a median diameter of at least 10 $\mu$m further at least 13 $\mu$m, preferably not less than 25 $\mu$m, and most preferably not less than 30 $\mu$m.

As shown in the Example 53, Comparative Example 15, Example 75 and Comparative Example 26 and the like in the Tables 11 to 16, it is recognized that the scaly glittering particles preferably have a ratio of smoothness on the particle surface to a median diameter of not greater than 0.011 in respect of the glittering feeling.

In addition, as shown in each of the Examples and Comparative Examples, that is, in the Examples 58, 57, 60, the Comparative Examples 16, the Examples 79, 84, Comparative Example 30 and the like in the Tables 11 to 16, it is recognized that the particles having the surface coating ratio of the said colorant on the said particle surface of not greater than 80% preferably not greater than 40% in a state of dried written marks are preferable.

In addition, it is recognized that the ink having the pseudo-plasticity fluidity (thixotropic property) with the said thixotropy index (T.I. value) of not less than 1.3 represented by the ratio of V0.5 to V1.0 (V0.5/V1.0), wherein V0.5 is the viscosity with the rotation speed of 0.5 rpm and V1.0 is the viscosity with the rotation speed of 1.0 rpm when the ink is measured by an ELD-typed viscometer (3° R 14 cone, at the temperature of 20° C.) and with V0.5 of 1000~15000mPa·s, the viscosity when measured by an ELD-typed viscometer with a rotation speed of 0.5 rpm(3° R14 cone at the temperature of 20° C.) is desirable.

Moreover, as shown in each of the Examples and Comparative Examples, that is, in the Examples 64,84,63, and in the Comparative Examples 19,28~31 in the Tables 11 to 16, it is recognized that the written mark which intersperses this scaly glittering particles to the total written surface with the range of not greater than 80%, preferably within the range of 20~48% is good in respect of color development and glittering feeling.

Further, as shown in each of the Examples and Comparative Examples in the Tables 11 to 16, it is recognized that the concave-convex rate which the resin film covers the surface of the scaly glittering particles not greater than 0.15 $\mu$m is excellent in glittering feeling. It was also recognized to be preferable to have the smoothness of the coated films which is not less than 9 $\mu$m.

Here, the present invention includes the identical subject matter disclosed in the specification, claims of Japanese patent applications No. 11-76868, No.11-360187, No.2000-2370 and No.2000-2344 to which is claimed priority for the present application.

What is claimed is:

1. An aqueous glittering ink comprising
   scaly glittering particles,
   a water-soluble resin,
   a water-soluble organic solvent,
   a colorant,
   a binder component for fixing the said scaly particles to a written mark or a coated film; and
   water,
   wherein said scaly glittering particles have
   a median diameter of at least 10 $\mu$m,
   the ratio of smoothness on the particle surface to the median diameter of not greater than 0.011, and
   a surface coating ratio of said colorant covering the surface of said particle's surface in a written mark of not greater than 80% in a state of a dried written mark.

2. An aqueous glittering ink as set forth in claim 1, wherein the ink has a thixotropic property.

3. An aqueous glittering ink as set forth in claim 2, wherein the ink has a thixotropy index, of not less than 1.3 represented by the ratio of V0.5 to V1.0 (V0.5/V 1.0), wherein V0.5 is the viscosity with the rotation speed of 0.5 rpm and V1.0 is the viscosity with the rotation speed of 1.0 rpm when the ink is measured by an ELD viscometer with a 3° R14 cone, at a temperature of 20° C.

4. An aqueous glittering ink as set forth in claim 2, wherein the ink has a viscosity of about 1000–15000 mPa·s when measured by an ELD viscometer with a 3° R14 cone, rotation speed: 0.5 rpm at a temperature of 20° C.

5. An aqueous glittering ink as set forth in claim 1, wherein said scaly glittering particles comprise glass flake particles.

6. An aqueous glittering ink as set forth in claim 1, wherein said scaly glittering particles comprise metal coated inorganic particles.

7. An aqueous glittering ink as set forth in claim 1, wherein the content of the said scaly glittering particles is 0.01–40% by weight relative to the total amount of the ink.

8. An aqueous glittering ink as set forth in claim 1, wherein the said scaly glittering particles have a median diameter of at least 25 $\mu$m.

9. An aqueous glittering ink as set forth in claim 1, wherein the water-soluble resin is contained in 0.01–40% by weight relative to the total amount of the ink.

10. An aqueous glittering ink as set forth in claim 1, wherein the colorant is contained in 0.01–30% by weight relative to the total amount of the ink.

11. An aqueous glittering ink as set forth in claim 1, further containing an opacifying pigment.

12. An aqueous glittering ink as set forth in claim 1, containing a synthetic resin emulsion as the said binder component.

13. An aqueous glittering ink as set forth in claim 12, wherein the said synthetic resin emulsion is contained in 0.01–40% by weight in solids relative tot the total amount of the ink.

14. An aqueous glittering ink as set forth in claim 13, wherein the content of said scaly glittering particles is 0.01–40% by weight, the water-soluble resin is 0.01–40% by weight and the water-soluble organic solvent is 1–40% by weight, relative to the total amount of the ink.

15. An aqueous glittering ink as set forth in claim 14, further containing the colorant in 0.01–30% by weight relative to the total amount of the ink.

16. An aqueous glittering ink composition as set forth in claim 12, wherein the said synthetic resin emulsion has an anionic property or a nonionic property and its minimum film forming temperature is not higher than 20° C.

17. An aqueous glittering ink as set forth in claim 12, further containing an opacifying pigment.

18. A method for forming a written mark comprising scaly glittering particles, wherein scaly glittering particles have a median diameter of at least 10 μm, the ratio of smoothness on the particle surface to said median diameter is not greater than 0.011, and the surface coating ratio of a colorant to the scaly glittering particles is not greater than 80%, interspersing the scaly glittering particles within the range of not greater than 80% to the total written surface, and interspersing said colorant's particles among said scaly glittering particles.

19. A method for forming a written mark as set forth in claim 18, wherein a binder resin contained in an ink for fixing said scaly glittering particles to the written mark forms a coated film on said glittering particles, the degree of roughness of the coated film covering the surface of said scaly glittering particles is not greater than 0.15 μm.

20. A method for forming a written mark as set forth in claim 18, wherein the smoothness of the written mark is not less than 9 μm.

21. A method for forming a written mark comprising scaly glittering particles, wherein scaly glittering particles have a median diameter of at least 25 μm, the ratio of smoothness on the particle surface to said median diameter is not greater than 0.011, and the surface coating ratio of a colorant to the scaly glittering particles is not greater than 40%, interspersing the scaly glittering particles within the range of 20–45% to the total written surface, and interspersing said colorant's particles among said scaly glittering particles.

22. A written mark having the characteristics of an aqueous glittering ink, wherein scaly glittering particles have a median diameter of at least 10 μm, the ratio of smoothness on the particle surface to the said median diameter is not greater than 0.011, and the surface coating ratio of a colorant to the scaly glittering particles is not greater than 80%, interspersing the scaly glittering particles within the range of not greater than 80% to the total written surface, and interspersing the said colorant's particles among the said scaly glittering particles.

23. A written mark as set forth in claim 22, wherein a binder resin contained in an ink for fixing said scaly glittering particles to the written mark forms a coated film on said glittering particles, a degree of roughness of said coated film covering the surface of said scaly glittering particles is not greater than 0.15 μm.

24. A written mark as set forth in claim 22, wherein the smoothness of the written mark is not less than 9 μm.

25. A written mark having the characteristics of an aqueous glittering ink, wherein scaly glittering particles have a median diameter of at least 25 μm, the ratio of smoothness on the particle surface to the said median diameter is not greater than 0.011, and the surface coating ratio of a colorant to the scaly glittering particles is not greater than 40%, interspersing the scaly glittering particles within the range of 20–45% to the total written surface, and interspersing the said colorant's particles among the said scaly glittering particles.

26. A ball-point pen with an aqueous glittering ink filled in the ink tank comprising scaly glittering particles, a water-soluble resin, a water-soluble organic solvent, a colorant, a binder component for fixing the said scaly glittering particles to a written mark or a coated film, and water, wherein said scaly glittering particles have a median diameter of at least 25 μm, and the a ratio of smoothness on the particle surface to a median diameter is not greater than 0.011, and a surface coating ratio of the said colorant covering the surface of the particle's surface in a written mark of not greater than 80% in a state of a dried written mark, a thixotropy index of not less than 1.3, represented by the ratio of V0.5 to V1.0 (V0.5/V1.0), wherein V0.5 is the viscosity with the rotation speed of 0.5 rpm and V1.0 is the viscosity with the rotation speed of 1.0 rpm when the ink is measured by an ELD viscometer with a 3° R14 cone, at a temperature of 20° C. and the V0.5, the viscosity with the rotation speed of 0.5 rpm, of 1000–15000 mPa.

27. A method for forming a coated film comprising scaly glittering particles, wherein the scaly glittering particles have a median diameter of at least 10 μm, the ratio of smoothness on the particle surface to said median diameter is not greater than 0.011, and the surface coating ratio of a colorant to the scaly glittering particles is not greater than 80%, interspersing the scaly glittering particles within the range of not greater than 80% to the total written surface, and interspersing said colorant's particles among the said scaly glittering particles.

28. An aqueous glittering ink comprising scaly glittering particles, a water-soluble resin, a water-soluble organic solvent, a colorant, a binder component for fixing the said scaly glittering particles to a written mark or a coated film, and water, wherein said scaly glittering particles have a median diameter of at least 30 μm, the ratio of smoothness on the particle surface to the median diameter is not greater than 0.011, and a surface coating ratio of said colorant covering the surface of said particle's surface in a written mark is not greater than 80% in a state of a dried written mark.

29. An aqueous glittering ink as set forth in claim 28, wherein the ink has a thixotropy index of not less than 1.3 represented by the ratio of V0.5 to V1.0 (V0.5/V1.0), wherein V0.5 is the viscosity with the rotation speed of 0.5 rpm, and V1.0 is the viscosity with the rotation speed of 1.0 rpm when the ink is measured by an ELD viscometer with a 3° R14 cone, at a temperature of 20° C.

30. An aqueous glittering ink as set forth in claim 28, wherein the scaly glittering particles are selected from the group consisting of flaky glass coated with metal, inorganic particles coated with metal, and aluminum powder.

31. A method for forming a coated film comprising scaly glittering particles, wherein scaly glittering particles have a median diameter of at least 25 μm, the ratio of smoothness on the particle surface to said median diameter is not greater than 0.011, and the surface coating ratio of a colorant to the scaly glittering particles is not greater than 80%, interspersing the scaly glittering particles within the range of not greater than 80% to the total written surface, and interspersing said colorant's particles among the said scaly glittering particles.

32. A method for forming a coated film comprising scaly glittering particles, wherein scaly glittering particles have a median diameter of 25–100 μm, the ratio of smoothness on the particle surface to said median diameter is not greater than 0.011, and the surface coating ratio of a colorant to the scaly glittering particles is not greater than 40%, interspersing the scaly glittering particles within the range of not greater than 20–45% to the total written surface, and interspersing said colorant's particles among the said scaly glittering particles.

* * * * *